(12) United States Patent
Hasegawa et al.

(10) Patent No.: US 9,732,666 B2
(45) Date of Patent: Aug. 15, 2017

(54) INTAKE CONTROL VALVE AND INTAKE APPARATUS

(71) Applicant: AISIN SEIKI KABUSHIKI KAISHA, Kariya-shi, Aichi-ken (JP)

(72) Inventors: Motonobu Hasegawa, Kariya (JP); Masato Ishii, Kariya (JP); Takuya Kato, Nagoya (JP); Keisuke Sekiguchi, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/660,010

(22) Filed: Mar. 17, 2015

(65) Prior Publication Data

US 2015/0267656 A1    Sep. 24, 2015

(30) Foreign Application Priority Data

Mar. 18, 2014 (JP) ................. 2014-054737

(51) Int. Cl.
*F02B 27/02* (2006.01)
*F02D 9/10* (2006.01)

(52) U.S. Cl.
CPC ...... *F02B 27/0252* (2013.01); *F02B 27/0273* (2013.01); *F02D 9/106* (2013.01); *F02D 9/107* (2013.01); *F02D 9/108* (2013.01); *F02D 9/1015* (2013.01); *F02D 9/1045* (2013.01); *F02D 9/1085* (2013.01); *Y02T 10/146* (2013.01)

(58) Field of Classification Search
CPC .............. F02B 27/0252; F02B 27/0273; F02D 9/1015; F02D 9/1045; F02D 9/107; F02D 9/108; F02D 9/1085; F02D 9/106; Y02T 10/146

USPC ........................................ 123/184.59, 184.61
See application file for complete search history.

(56) References Cited

U.S. PATENT DOCUMENTS

| 6,722,335 | B2* | 4/2004 | Nomura ................. F02B 27/02 |
| | | | 123/184.36 |
| 6,796,280 | B2* | 9/2004 | Yamamoto ............. F02B 27/02 |
| | | | 123/184.36 |
| 8,714,522 | B2* | 5/2014 | Hasegawa ............ F02D 9/1015 |
| | | | 123/337 |
| 9,121,375 | B2* | 9/2015 | Ishii ................. F02M 35/10321 |
| 2002/0195076 | A1* | 12/2002 | Nomizo ............. B29C 65/1635 |
| | | | 123/184.57 |
| 2007/0113823 | A1* | 5/2007 | Fukumori ............... F02D 9/106 |
| | | | 123/336 |

(Continued)

FOREIGN PATENT DOCUMENTS

| JP | 2005-127252 A | 5/2005 |
| JP | 2008-144768 A | 6/2008 |

*Primary Examiner* — Marguerite McMahon
(74) *Attorney, Agent, or Firm* — Buchanan Ingersoll & Rooney PC

(57) ABSTRACT

An intake control valve includes a valve body being made of resin, the valve body configured to be pivotally mounted to a surge tank of an internal combustion engine, the valve body pivoting between an open position and a closed position to for opening and closing a fluid passage formed at a division wall, the division wall dividing inside of the surge tank into two portions; and a bearing being made of metal, the bearing being integrally provided with a first end portion of the valve body by insert molding when resin molding the resin-made valve body.

16 Claims, 13 Drawing Sheets

(56) References Cited

U.S. PATENT DOCUMENTS

2007/0245561 A1* 10/2007 Miyauchi ............ B29C 45/1671
29/890.122
2009/0159043 A1* 6/2009 Asanuma ............ B29C 45/1671
123/337
2014/0116377 A1 5/2014 Ishii et al.

* cited by examiner

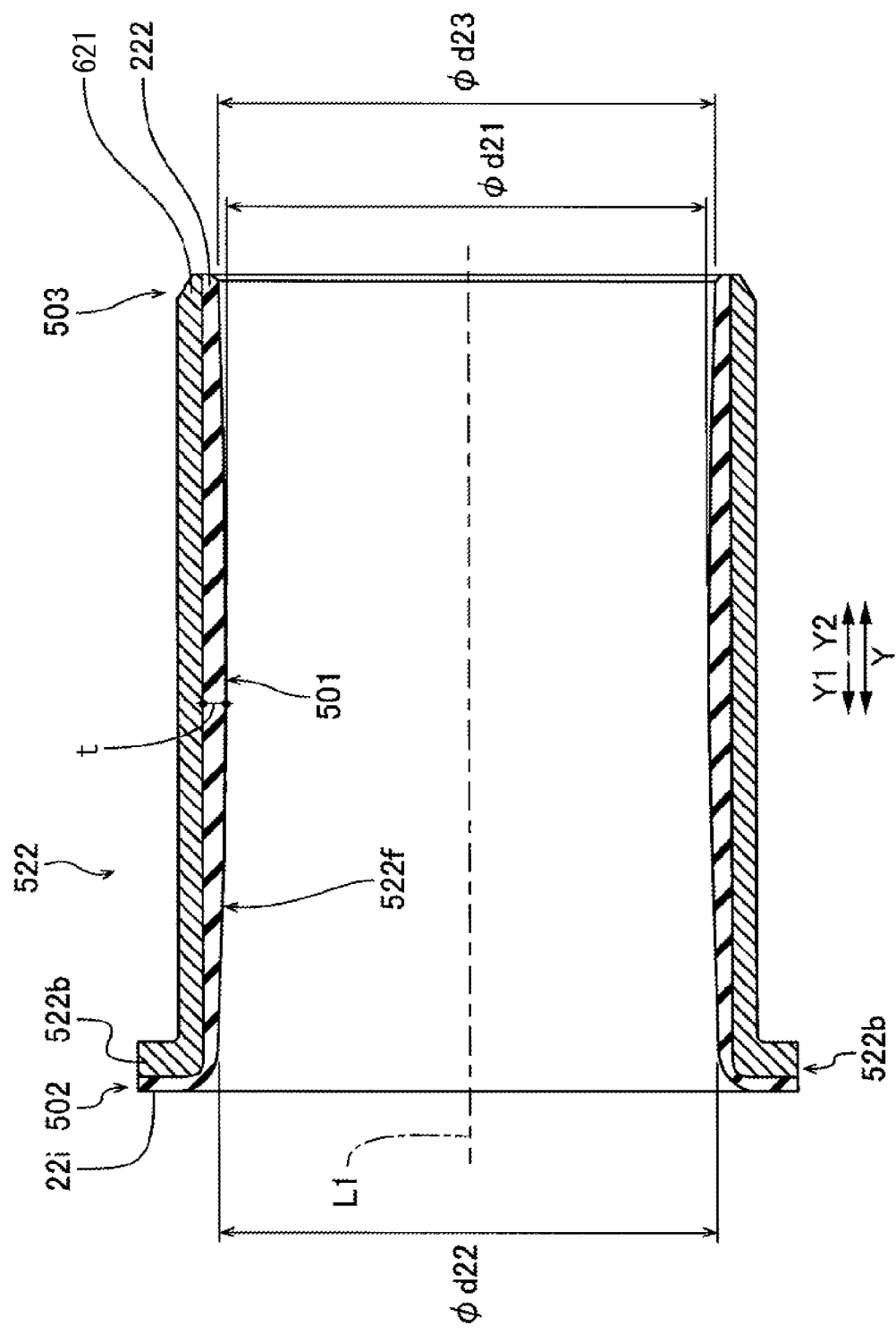

INTAKE CONTROL VALVE AND INTAKE APPARATUS

CROSS REFERENCE TO RELATED APPLICATIONS

This application is based on and claims priority under 35 U.S.C. §119 to Japanese Patent Application 2014-054737, filed on Mar. 18, 2014, the entire content of which is incorporated herein by reference.

TECHNICAL FIELD

This disclosure generally relates to an intake control valve and an intake apparatus.

BACKGROUND DISCUSSION

A known intake control valve apparatus (intake control valve) which includes a resin-made frame and a metal-made valve (valve body) is disclosed in JP2005-127252A (hereinafter referred to as Patent reference 1). The resin-made frame is formed with an opening portion (a fluid passage) which passes through a division wall dividing inside a surge tank into two portions. The metal-made valve (the valve body) pivots to selectively open the opening portion of the frame by an application of an actuator. According to the intake control valve apparatus disclosed in Patent reference 1, at a connection portion of the frame and the valve being disposed next to each other along a pivot axis, an one end of a metal-made pivot shaft is press-fitted into a shaft holding portion of the valve (a pivot shaft holding portion) which is formed in a bottomed cylindrical portion. A metal-made bearing bush is press-fitted into a bearing portion (a bearing holding portion) of the frame which is formed in a cylindrical through hole. Because the other end of the pivot shaft of the valve is positioned in a bearing bush provided at the frame, the valve is pivotally supported by the frame.

According to the intake control valve apparatus disclosed in Patent reference 1, because the bearing structure is configured such that the metal-made bearing bush is press-fitted into the bearing portion (the bearing holding portion) of the resin-made frame, the bearing portion of the frame is formed thick to prevent the resin-made frame from cracking caused by a difference in linear expansion coefficient between resin material and metal material. The thick bearing portion (the bearing holding portion) is formed in a shape which significantly protrudes from a surface of a portion of the frame, the portion being disposed close to the valve. The protruding shape of the thick bearing portion causes an increase of the resistance (an increase of the pressure loss) at the opening portion (the fluid passage). Accordingly, because the intake air amount flowing through the intake passage decreases in accordance with the increase of the flow resistance applied to the intake air when the valve (the valve body) is opened, sufficient supercharging effect cannot be obtained. In a case where the valve body is made from a resin material for upsizing the valve body (increasing the diameter of the fluid passage) and the bearing structure equivalent to the bearing structure applied to the aforementioned frame is applied to the valve body, the bearing portion of the valve is formed thick because the bearing bush is press-fitted into the bearing portion (the bearing holding portion).

A need thus exists for an intake control valve and an intake apparatus which are not susceptible to the drawback mentioned above.

SUMMARY

According to an aspect of this disclosure, an intake control valve includes a valve body being made of resin, the valve body configured to be pivotally mounted to a surge tank of an internal combustion engine, the valve body pivoting between an open position and a closed position to for opening and closing a fluid passage formed at a division wall, the division wall dividing inside of the surge tank into two portions; and a bearing being made of metal, the bearing being integrally provided with a first end portion of the valve body by insert molding when resin molding the resin-made valve body.

According to another aspect of this disclosure, an intake apparatus includes a surge tank being provided at an internal combustion engine; a valve body being made of resin, the valve body being pivotally mounted to the surge tank of an internal combustion engine, the valve body pivoting between an open position and a closed position to for opening and closing a fluid passage formed at a division wall, the division wall dividing inside of the surge tank into two portions; and a bearing being made of metal, the bearing being integrally provided with a first end portion of the valve body by insert molding when resin molding the resin-made valve body.

BRIEF DESCRIPTION OF THE DRAWINGS

The foregoing and additional features and characteristics of this disclosure will become more apparent from the following detailed description considered with the reference to the accompanying drawings, wherein:

FIG. 15 is an enlarged cross sectional view illustrating a state where the first end portion of the intake control valve (valve body) is held according to the second embodiment.

DETAILED DESCRIPTION

First and second embodiments will be explained with reference to the drawings.

An intake apparatus 100 of the first embodiment will be explained with reference to FIGS. 1 to 10.

Figure 1:
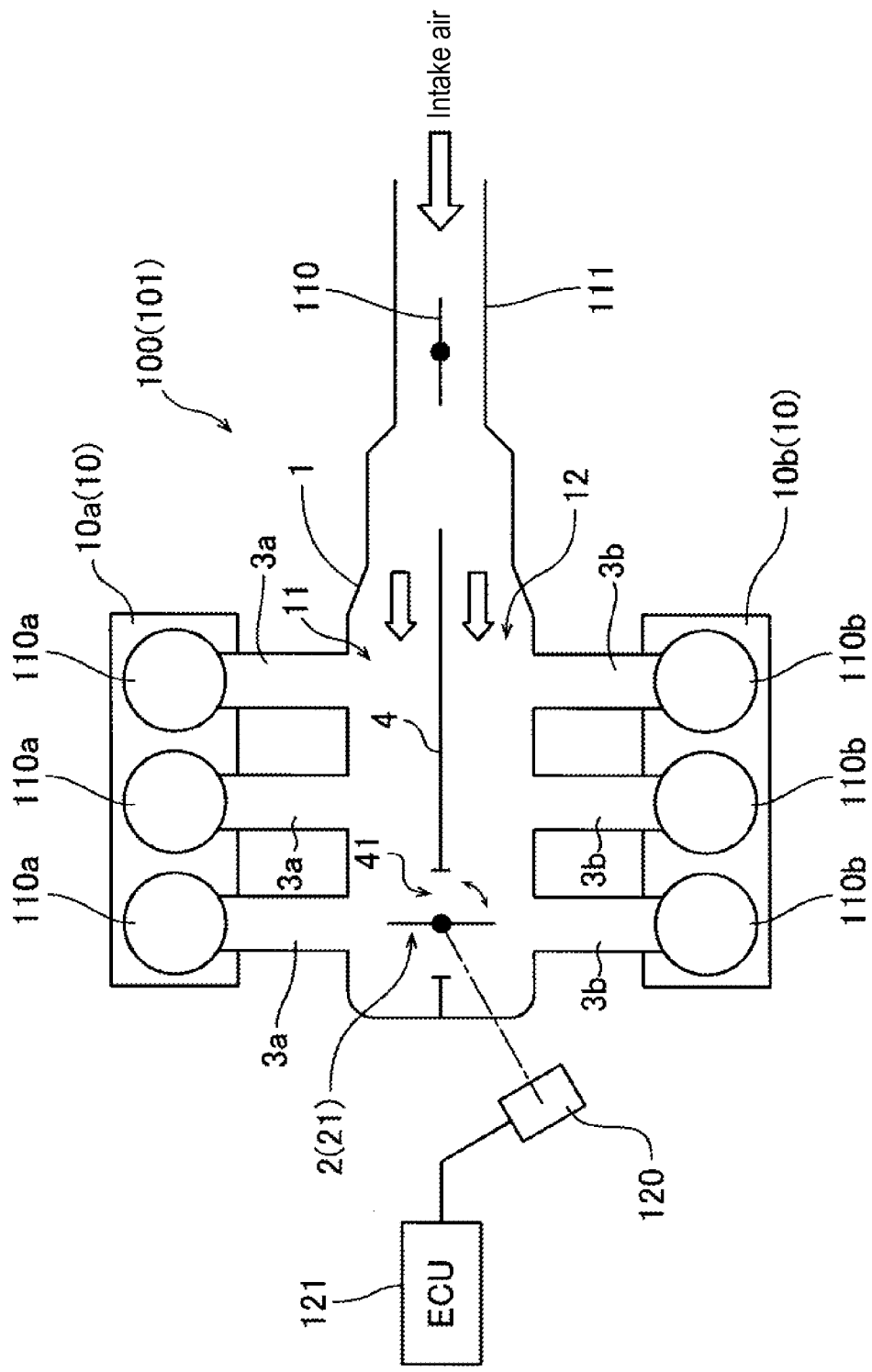
FIG. 1 is a view schematically illustrating the construction of an intake apparatus according to a first embodiment disclosed here.
Figure 2:
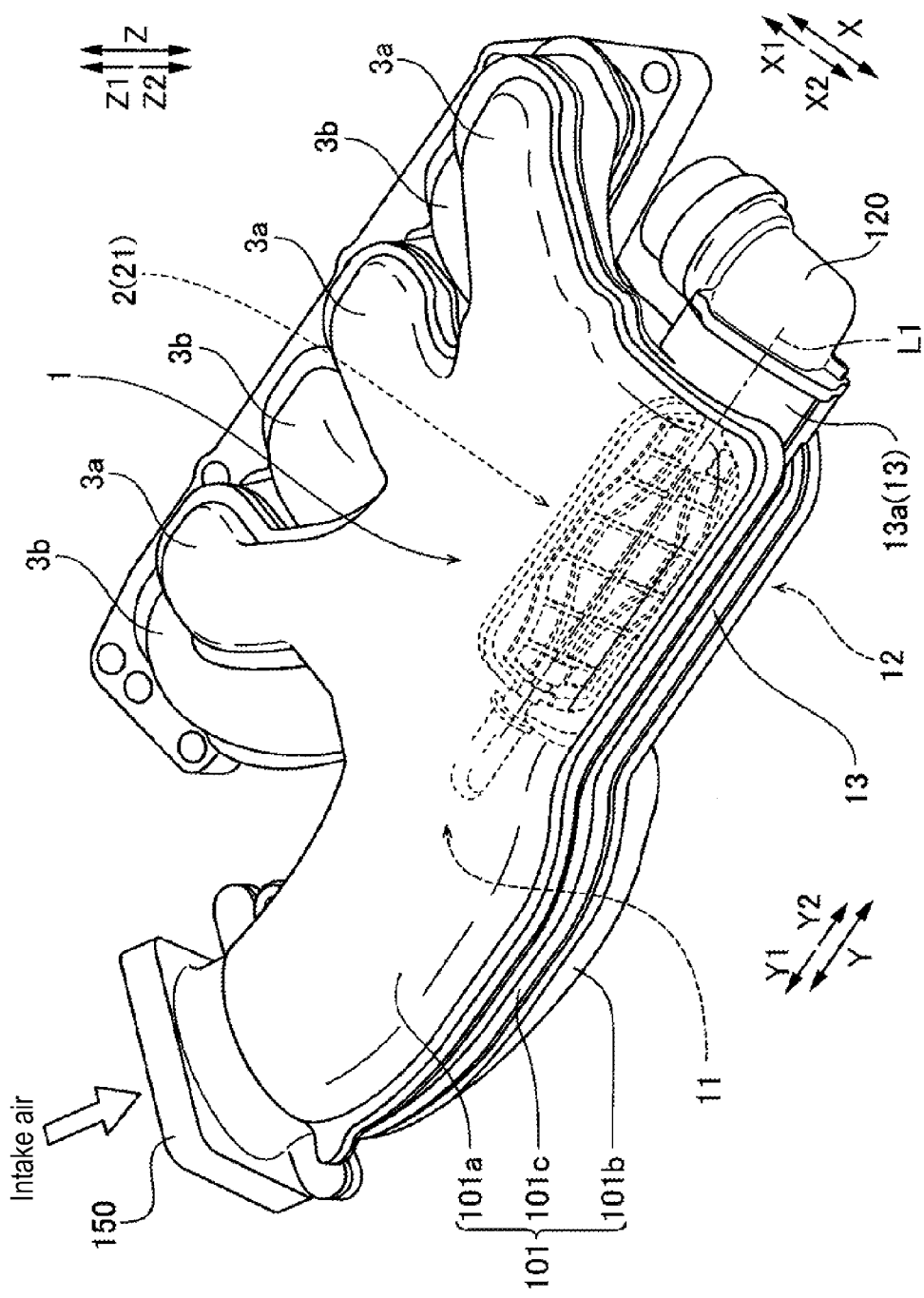
FIG. 2 is a perspective view illustrating the construction of the intake apparatus according to the first embodiment.

As shown in FIG. 1, the intake apparatus 100 of the first embodiment corresponds to an intake apparatus which is mounted to, for example, a V6 engine 10 (i.e., serving as an internal combustion engine) for an automobile. An intake apparatus body 101 of the intake apparatus 100 includes a surge tank 1, an intake control valve 2, three first intake ports 3a and three second intake ports 3b. The intake control valve 2 is provided inside the surge tank 1. The three first intake ports 3a and the three second intake ports 3b are disposed at a downstream of the surge tank 1, respectively. Structurally, as shown in FIG. 2, the intake apparatus 100 includes the intake apparatus body 101 which is integrally provided with the surge tank 1, the first intake ports 3a and the second intake ports 3b. As shown in FIG. 1, the intake control valve 2 is mounted inside the intake apparatus body 101. According to this disclosure, the V6 engine 10 corresponds to an example of an internal combustion engine.

As shown in FIG. 1, intake air flows in the surge tank 1 via an air cleaner or a throttle 110. The surge tank 1 includes a division wall 4 dividing or defining inside the surge tank 1 into a first surge tank 11 and a second surge tank 12. The intake control valve 2 opens and closes a fluid passage 41 which serves as an opening portion and which is defined by the division wall 4. The intake control valve 2 opens and closes the fluid passage 41 by a driving force of a known actuator 120. The actuator 120 is actuated on the basis of control signals transmitted from an Engine Control Unit (ECU) 121.

Each of the three first intake ports 3a connects the first surge tank 11 disposed at an upper portion (in a direction Z1) and each of three cylinders 110a disposed at a first bank 10a of the V6 engine 10. Each of the three second intake ports 3b connects the second surge tank 12 disposed at a lower portion (in a direction Z2) and each of three cylinders 110b disposed at a second bank 10b of the V6 engine 10. The three cylinders 110a of the first bank 10a are a cylinder number one, a cylinder number three and a cylinder number five, respectively, which do not ignite sequentially. The three cylinders 110b of the second bank 10b are a cylinder number two, a cylinder number four and a cylinder number six, respectively, which do not ignite sequentially. According to the aforementioned construction, because the fluid passage 41 appropriately opens and closes by the intake control valve 2 in accordance with the rotary speed of the engine (the V-6 engine 10), the intake apparatus 100 of the first embodiment obtains efficient supercharging effect in various engine operation range by changing resonant frequency of the intake system. Hereinafter, the construction of the intake apparatus 100 will be explained in detail.

Figure 3:
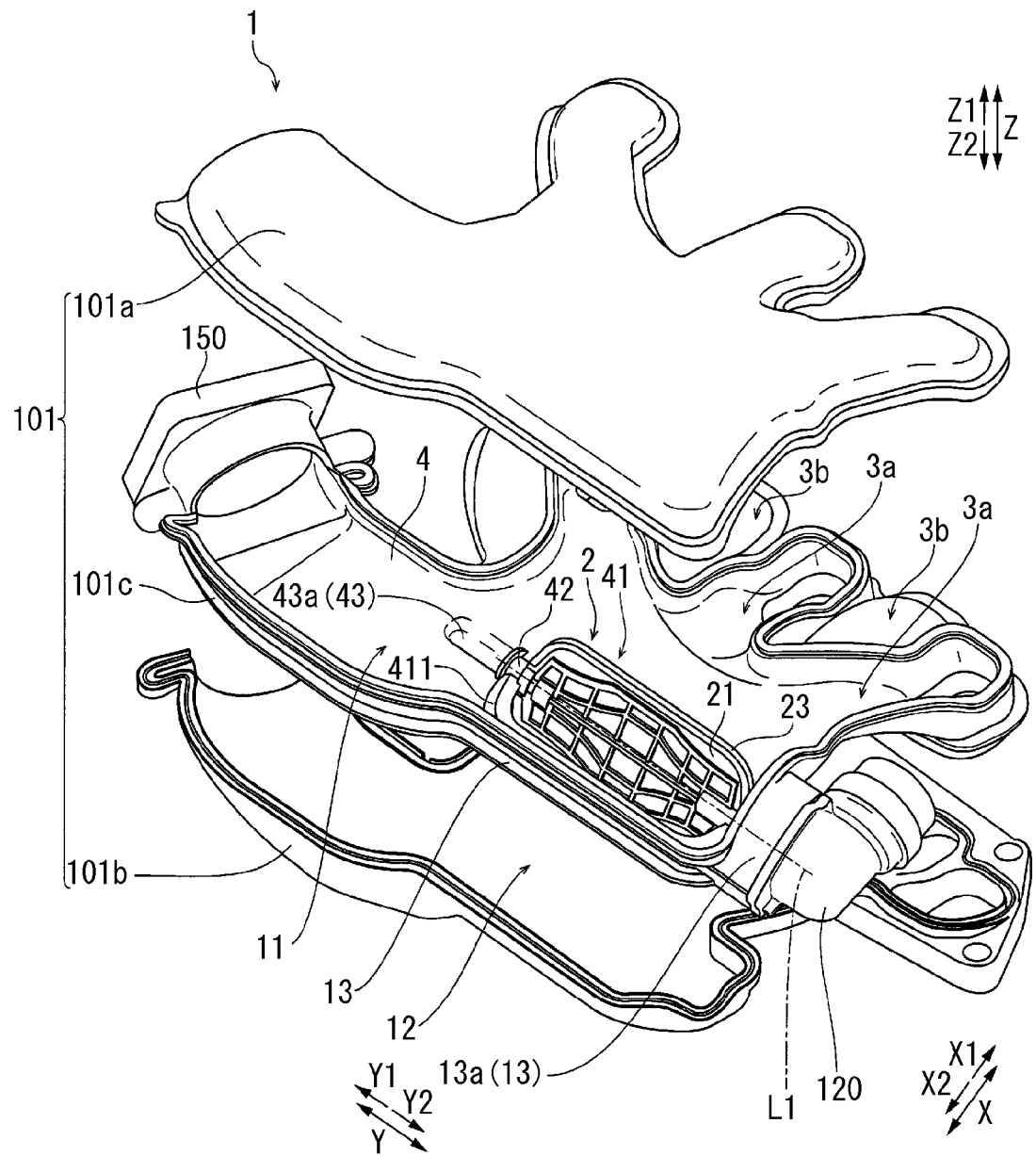
FIG. 3 is an exploded perspective view illustrating the construction of the intake apparatus according to the first embodiment.

As shown in FIGS. 2 and 3, the intake apparatus body 101 is provided with an upper piece 101a, a lower piece 101b, and a middle piece 101c which is sandwiched between the upper piece 101a and the lower piece 101b. The upper piece 101a, the lower piece 101b, and the middle piece 101c are made of resin and are integrally fixed with one another by vibration welding. A connection portion 150 is connected with an intake passage 111 (see FIG. 1) which extends from the throttle 110. The connection portion 150 is integrally formed with a portion (in a direction Y1) of the middle piece 101c, the portion where the intake air flows in. The division wall 4 (see FIG. 1) of the surge tank 1 is integrally formed with the middle piece 101c. The first surge tank 11 and the three first intake ports 3a are provided at the upper piece 101a and the middle piece 101c. The second surge tank 12 and the three second intake ports 3b are provided at the lower piece 101b and the middle piece 101c. The first surge tank 11 and the second surge tank 12 are disposed overlappingly with each other in an up-down direction (in a direction Z).

Figure 5:
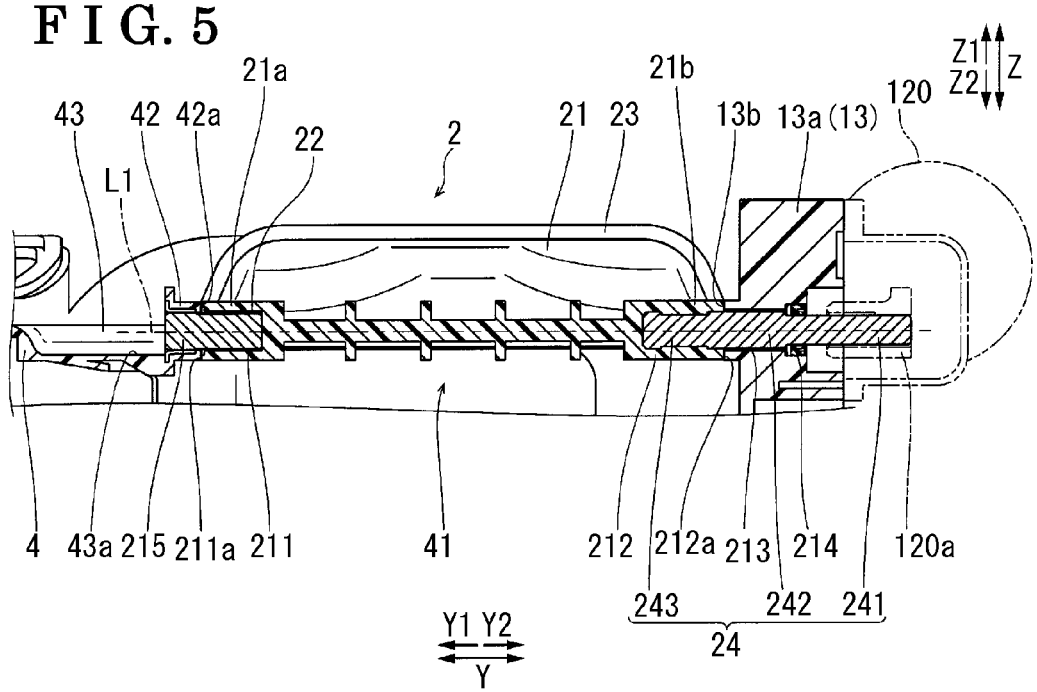
FIG. 5 is a cross sectional view illustrating a state where the intake control valve is mounted to the surge tank according to the first embodiment.
Figure 10:
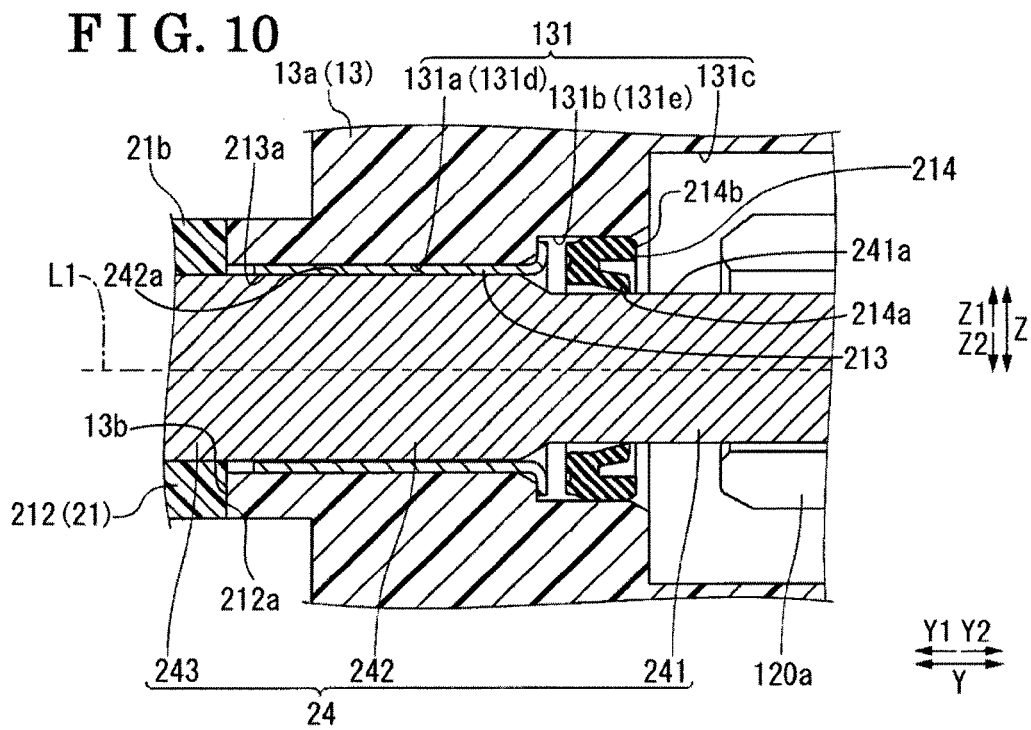
FIG. 10 is an enlarged cross sectional view illustrating a state where a second end portion of the intake control valve (valve body) is held according to the first embodiment.

A valve body 21 of the intake control valve 2 is pivotally supported by the surge tank 1. As shown in FIG. 5, a pivot shaft support portion 13a is integrally formed with the surge tank 1 at a position of an outer circumferential wall portion 13 of the surge tank 1, the position corresponding to the fluid passage 41 which is disposed in the surge tank 1 (in a direction Y2). The pivot shaft support portion 13a is formed thicker than other portions of the outer circumferential wall portion 13. Here, as shown in FIG. 10, the pivot shaft support portion 13a includes a pivot shaft support hole 131 having a circular cross section and extending in a direction Y. An inner diameter of the pivot shaft support hole 131 gradually increases from an inner side of the surge tank 1 (in the direction Y1) to an outer side of the surge tank 1 (in the direction Y2) to form a small diameter portion 131a, an intermediate diameter portion 131b and a large diameter portion 131c. As described above, the fluid passage 41 corresponds to the opening portion which is divided or defined by the division wall 4 of the surge tank 1. As shown in FIG. 3, the fluid passage 41 is disposed at a position close to a side (in the direction Y2) which is opposite to the inflow portion of the intake air of the surge tank 1. The fluid passage 41 is disposed at a position close to a side (in a direction X2) which is opposite to a position (in a direction X1) where the first inlet ports 3a and the second inlet ports 3b are disposed. The fluid passage 41 is formed in a shape which accords with the outer shape of the valve body 21 of the intake control valve 2. In a planar view, the fluid passage 41 is formed in a longitudinal shape extending in the direction Y.

Figure 7:
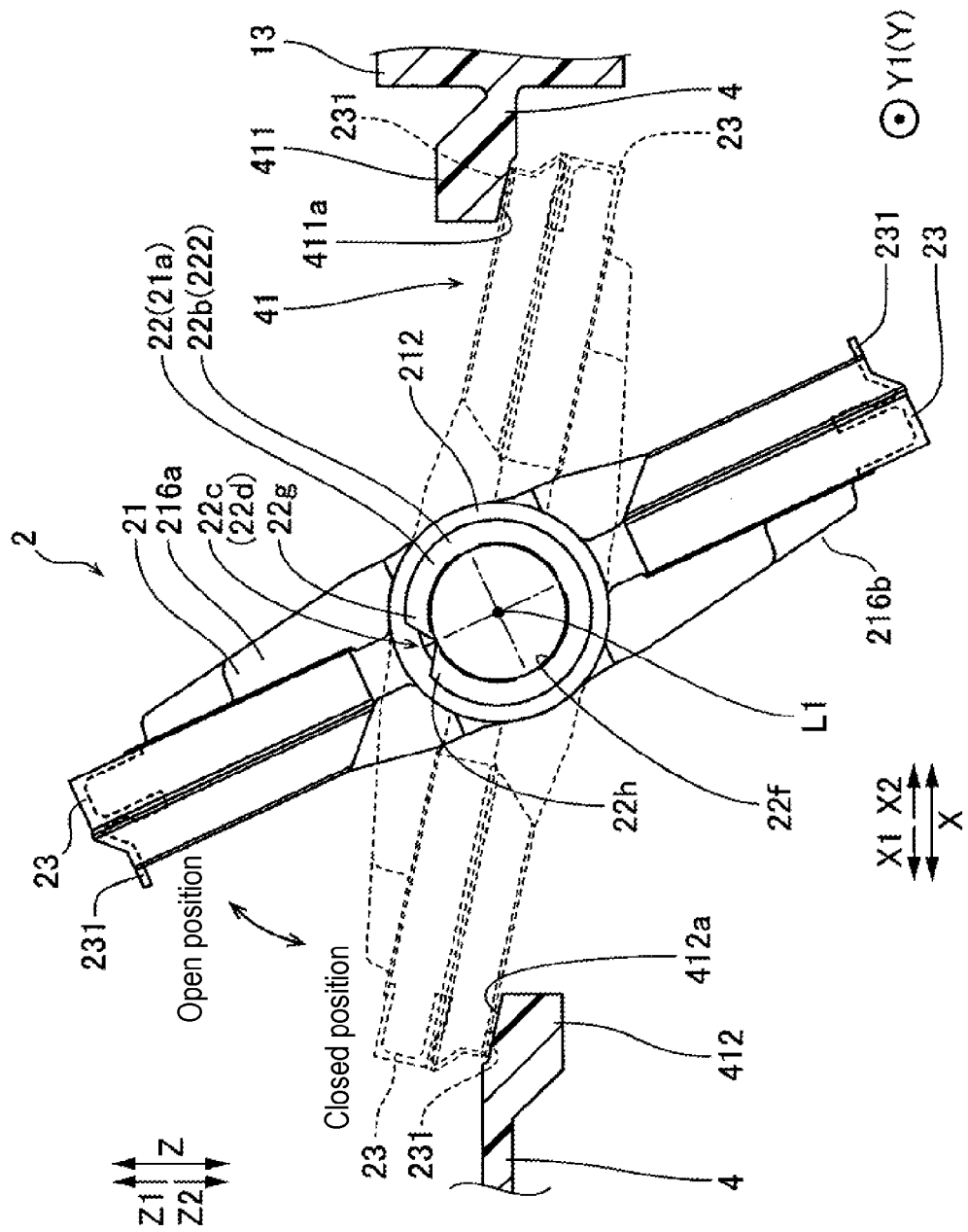
FIG. 7 is a side view illustrating the construction of the first end portion of the intake control valve (valve body) according to the first embodiment.

As shown in FIGS. 3 and 7, a first protrusion 411 is disposed at a position of the fluid passage 41 of the division wall 4 in the direction X2 (close to a position in the direction X2 than a shaft member fixing portion 42) and protrudes upward (close to the first surge tank 11) along a rim portion of the fluid passage 41. As shown in FIG. 7, a second protrusion 412 is disposed at a position of the fluid passage 41 of the division wall 4 in the direction X1 (close to a position in the direction X1 than the shaft member fixing portion 42) and protrudes downward (close to the second surge tank 12) along the rim portion of the fluid passage 41.

As shown in FIG. 7, the respective first and second protrusions 411, 412 are formed thicker than other portions of the division wall 4. The first protrusion 411 is provided with a first seal surface 411a which includes an inclination surface or a tilt surface being inclined or tilted upward toward the inner side of the fluid passage 41. The second protrusion 412 is provided with a second seal surface 412a which includes an inclination surface or a tilt surface being inclined or tilted downward toward the inner side of the fluid passage 41. The first and second seal surface 411a, 412a are disposed along the rim portion of the fluid passage 41.

Figure 4:
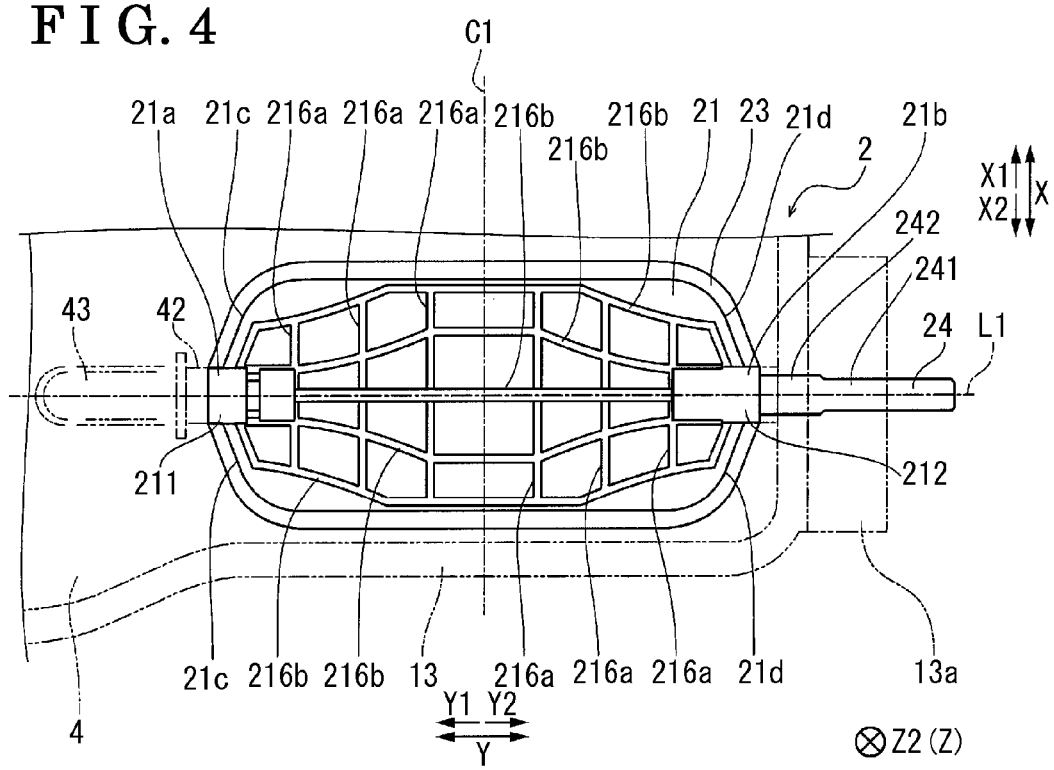
FIG. 4 is a plan view illustrating a state where an intake control valve provided at the intake apparatus is supported by a surge tank according to the first embodiment.
Figure 6:
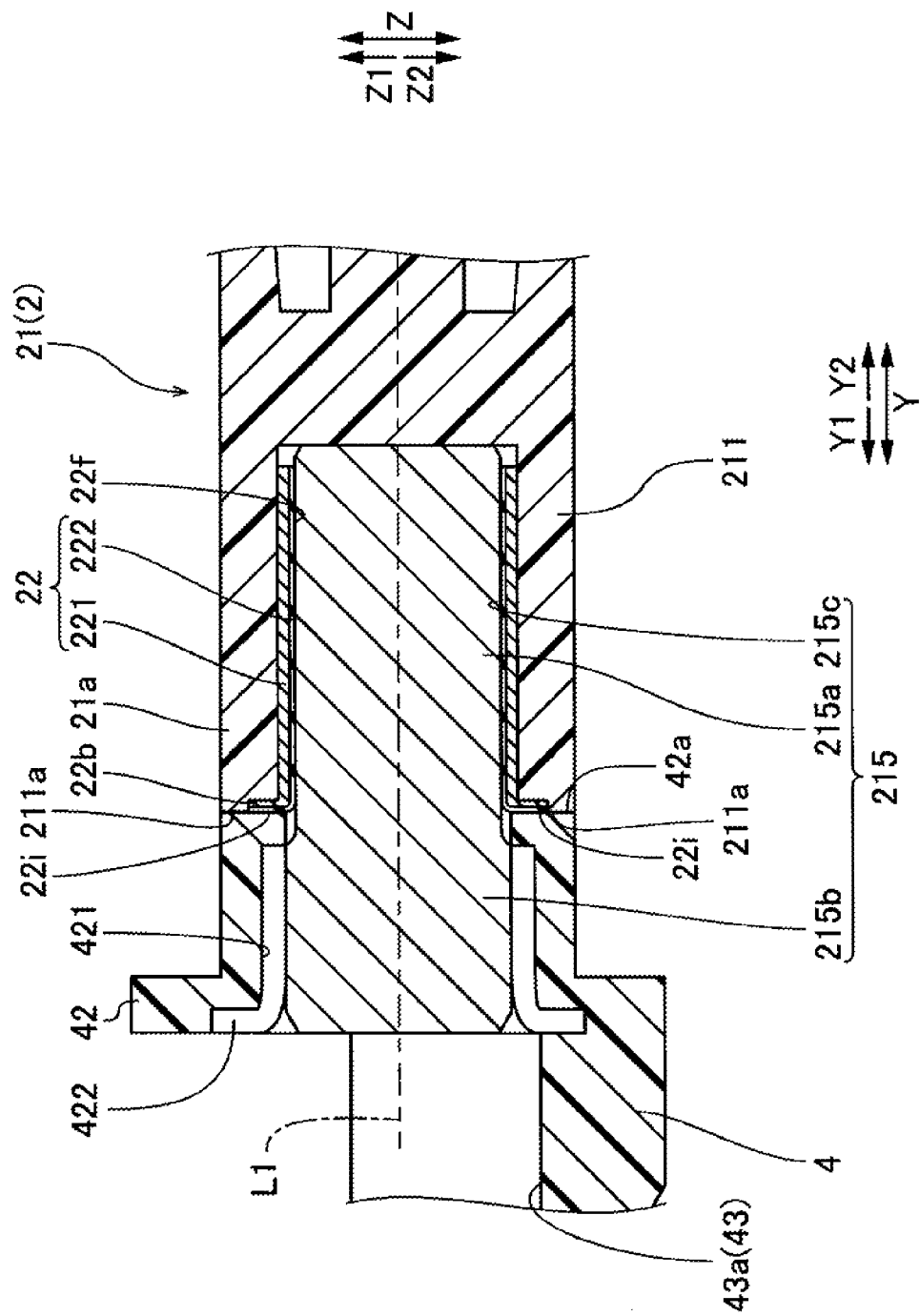
FIG. 6 is an enlarged cross sectional view illustrating a state where a first end portion of the intake control valve (valve body) is held according to the first embodiment.

As shown in FIGS. 4 and 5, the shaft member fixing portion 42 is integrally formed with the division wall 4. The shaft member fixing portion 42 is disposed at an end portion of the fluid passage 41 in the direction Y1 and extends in the direction Y. As shown in FIG. 6, the shaft member fixing portion 42 includes a shaft member support hole 421 defining a circular cross section and extending in the direction Y. As shown in FIGS. 5 and 6, the shaft member support hole 421 is integrally provided with a bush member 422 which is made of metal, for example, stainless steel or aluminum alloy. The bush member 422 is integrally formed (insert-molded) with the division wall 4 when resin molding the middle piece 101c of the surge tank 1. A recess 43 is provided at the shaft member fixing portion 42 of the division wall 4 so that a shaft member 215 (see FIG. 6) is inserted into the shaft member fixing portion 42. The recess 43 is recessed downward (in the direction Z2) and extends in the direction Y. As shown in FIG. 6, a bottom surface 43a of the recess 43 is disposed at a position which includes the height equivalent to the height of an inner surface of the shaft member support hole 421 in the direction Z2. That is, the bottom surface 43a is disposed in a planar manner with the inner surface of the shaft member support hole 421. In other words, the bottom surface 43a is flush with the inner surface of the shaft member support hole 421.

According to the first embodiment, the intake control valve 2 is provided with the valve body 21 which is made of resin. The valve body 21 is pivotally mounted to the surge tank 1 to pivot about a pivot axis L1 between a closed position (a pivot position of the intake control valve 2 shown in dotted lines in FIG. 7) and an open position (a pivot position of the intake control valve 2 shown in solid lines in FIG. 7) to open and close the fluid passage 41 of the division wall 4. A first end portion 21a of the valve body 21 is disposed at a position of the valve body 21 in the direction Y1 which is along the axial direction of the valve body 21. The first end portion 21a is integrally formed with a first bearing 22 (i.e., serving as a bearing) which is made of metal (for example, stainless steel) and which pivots with the valve body 21 by insert molding. That is, the intake control valve 2 is configured such that the first end portion 21a of the valve body 21 is integrally formed with the bearing 2 by insert molding when resin molding the resin-made valve body 21.

Figure 8:
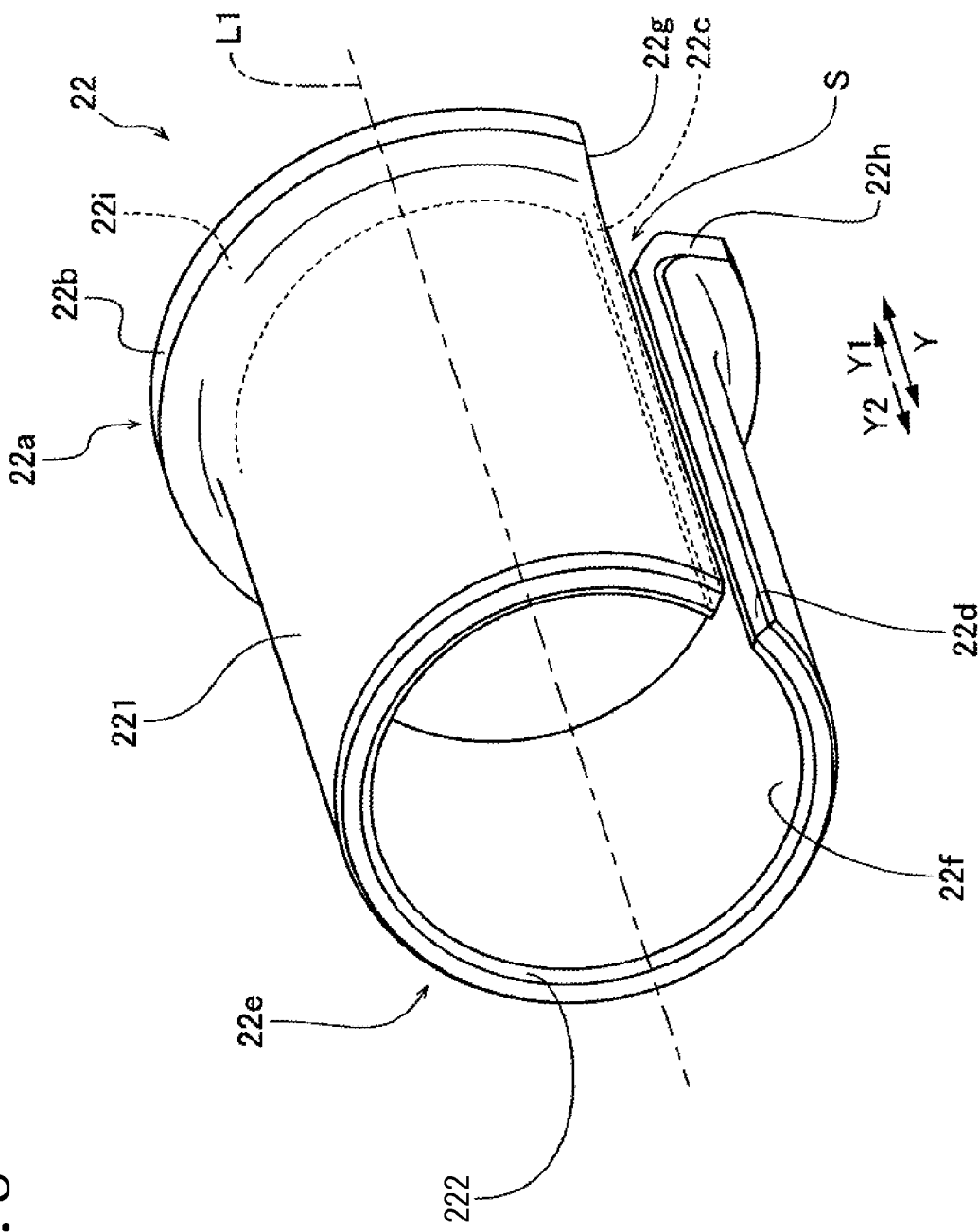
FIG. 8 is a perspective view illustrating a first bearing for supporting the first end portion of the intake control valve (valve body) according to the first embodiment.

As shown in FIG. 8, the first bearing 22 includes a body portion 221 and a resin layer 222. The body portion 221 is made of, for example, stainless steel and is formed in a cylindrical shape. The resin layer 222 is formed on an inner circumferential surface 22f of the body portion 221. That is, the inner circumferential surface 22f of the first bearing 22 is configured with the resin layer 222.

Here, the process for manufacturing the first bearing 22 will be explained. First, the resin layer 222 is laminated on a surface of a metal plate which includes a flat thickness or a constant thickness. The resin layer 222 is made of resin being mixed with fluororesin, for example, polytetrafluoroethylene, or PTFE which is a material having the slidability. The surface of the metal flat plate (for example, a stainless steel flat plate) is applied with the resin being mixed with fluoroersin and is sintered. Then, the metal plate laminated by the resin layer 222 is cut by a predetermined dimension. That is, the metal plate is cut into plural strips. Each of the plural strips includes a first side having a length of the first bearing 22 in the direction Y and a second side orthogonal to the first side having a peripheral length of the first bearing 22 relative to the pivot axis L1.

Then, the cut, strip-shaped plate is rolled cylindrically with a surface of the resin layer 222 inward to form the cylindrical portion of the first bearing 22. In addition, a first end portion 22a of the first bearing 22 is stamped to be folded outwardly in a radial direction to form a flange portion 22b. The first end portion 22a corresponds to a portion which is disposed at the first end portion 21a (Y1) of the valve body 21 when the bearing is insert-molded. The resin layer 222 is laminated not only on the inner circumferential surface 22f of the first bearing 22 but also on the flange portion 22b which extends from or which is continuously provided from the inner circumferential surface 22f. That is, the resin layer 222 is laminated on a surface 22i of the flange portion 22b, the surface 22i disposed at a position of the first bearing 22 in the direction Y1. Accordingly, as shown in FIG. 8, the first bearing 22 is formed in a natural state before being insert-molded. The resin layer 222 laminated on the inner circumferential surface 22f of the body portion 221 serves as an example of a first resin layer according to this disclosure. The resin layer 222 laminated on the surface 22i of the flange portion 22b serves as an example of a second resin layer according to this disclosure. As such, the first bearing 22 is formed in a natural state, as shown in FIG. 8, before being insert-molded.

According to the first embodiment, as shown in FIG. 8, the rolled first bearing 22 before being insert-molded, that is, the first bearing 22 in the natural state includes a clearance S between a first side end surface 22c (i.e., serving as a facing surface) and a second side end surface 22d (i.e., serving as a facing surface) which face each other in the circumferential direction. The clearance S extends from or which is continuously provided from the first end portion 22a to a second end portion 22e which is disposed opposite to the flange portion 22b in the direction Y. When resin molding the intake control valve 2, the first bearing 22 which is set on a molding device before being insert-molded (resin-molded) includes the first side end surface 22c and the second side end surface 22d which come in contact with each other by an application of the molding pressure. Thus, when the valve body 21 is molded, the cylindrical first bearing 22 including the circumferential surface 22f extending or continuously provided throughout the whole circumference is formed at a bearing holding portion 211 which corresponds to the first end portion 21a. The first side end surface 22c and the second side end surface 22d serve as an example of a pair of facing surfaces according to this disclosure.

As shown in FIG. 7, the flange portion 22b is provided with a first end portion 22g and a second end portion 22h in a circumferential direction. The first end portion 22g is disposed at a portion which extends from or which is continuously provided from the first side end surface 22c. The second end portion 22h is disposed at a portion which extends from or which is continuously provided from the second side end surface 22d. After being insert-molded to the valve body 21, the first bearing 22 includes the first end portion 22g and the second end portion 22h which are separated from each other while the first side end surface 22c and the second end surface 22d serving as a pair come in contact with each other in the circumferential direction. That is, because each of the first end portion 22g and the second end portion 22h includes a recess, the first side end surface 22c and the second side end surface 22d are securely in contact with each other.

Figure 9:
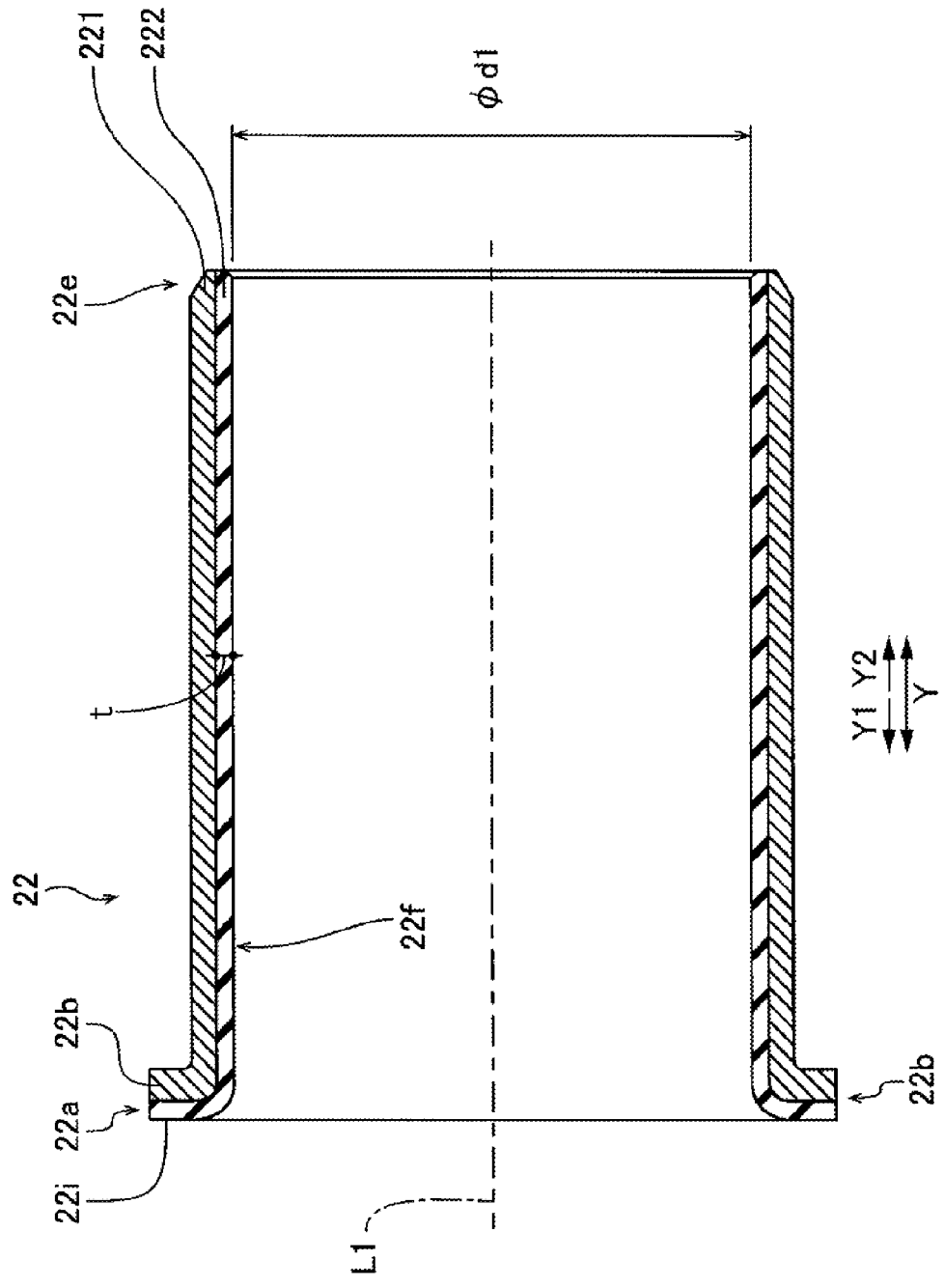
FIG. 9 is a cross sectional view illustrating the first bearing for supporting the first end portion of the intake control valve (valve body) according to the first embodiment.

As described above, because the resin layer 222 is mixed with the material which includes the slidability, the resin layer 222 of the first bearing 22 enhances the slidability of a sliding portion 215a (an outer circumferential surface 215c) of the shaft member 215 (see FIG. 6). In such a case, as shown in FIG. 9, a thickness t of the inner circumferential surface 22f of the resin layer 222 is constant or flat in the direction Y and in the circumferential direction, or in the direction orthogonal to the direction Y. That is, as shown in FIG. 9, an inner diameter dl of the first bearing 22 after being insert-molded to the valve body 21 (see FIG. 6) is constant along the pivot axis L1. Thus, as shown in FIG. 6, the sliding portion 215a (the outer circumferential surface 215c) of the shaft member 215 is in surface-contact with the inner circumferential surface 22f of the first bearing 22. Accordingly, because a surface layer portion (for example, fine resin material) of the resin layer 222 comes to be attached on the outer circumferential surface 215c of the sliding portion 215a in accordance with the sliding of the shaft member 215, the slidability of the shaft member 215 relative to the first bearing 22 is maintained.

In addition, the resin layer 222 which is mixed with the material having the slidability has sound absorbability. The sound absorbability of the resin layer 222 is especially effective on the circular surface 22i of the flange portion 22b. That is, as shown in FIGS. 5 and 6, the bearing holding portion 211 of the valve body 21 is configured such that an end surface 211a (i.e., serving as an outer end portion of a first end portion of a valve body) which is disposed at a position of the valve body 21 in the direction Y1 faces and is in contact with an end surface 42a of the shaft member fixing portion 42 which is disposed at a position of the valve body 21 in the direction Y2. Thus, in a state where the intake control valve 2 is fitted in the surge tank 1, the flange portion 22b of the first bearing 22 is in contact with the end surface 42a of the shaft member fixing portion 42 at a position of the valve body 21 in the direction Y1. In such a case, in a case where the intake control valve 2 backlashes in the axial direction (in the direction Y1 or the direction Y2) caused by, for example, the manufacturing deviation (or mounting error), the first bearing 22 and the shaft member fixing portion 42 come in contact with each other via the resin layer 222 of the flange portion 22b. Thus, the contact noise (rattling) of the first bearing 22 of the intake control valve 2 relative to the shaft member fixing portion 42 is reduced. The end surface 211a of the bearing holding portion 211 which is disposed at a position of the valve body 21 in the direction Y1 serves as an outer end portion of the first end portion 21a of a valve body 21 according to the disclosure.

As shown in FIG. 6, the end surface 211a of the bearing holding portion 211 which is disposed at the first end portion 21a of the valve body 21 comes in surface-contact with the circular surface 22i of the flange portion 22b by insert molding of the first bearing 22. The surface 22i of the flange portion 22b is formed to have a flat surface without protrusions and recesses relative to the end surface 211a of the bearing holding portion 211 of the valve body 21. Accordingly, the valve body 21 pivots relative to the surge tank 1 without generating the unwanted friction or, generating for example, cavities on the end surface 42a of the shaft member fixing portion 42, the end surface 42a corresponding to a sliding surface relative to the end surface 211a.

According to the first embodiment, as shown in FIG. 6, the first bearing 22 is pivotally supported by the shaft member 215 which is fixed to the shaft member fixing portion 42 of the division wall 4. The shaft member 215 is made of metal (for example, stainless steel or aluminum alloy) and includes the sliding portion 215a and a press-fit portion 215b. The sliding portion 215a slides on the first bearing 22. The press-fit portion 215b has the outer diameter larger than the outer diameter of the sliding portion 215a. The press-fit portion 215b of the shaft member 215 which has the larger outer diameter is press-fitted into and fixed to the bush member 422 which is made of metal and is disposed at the shaft member support hole 421.

As shown in FIGS. 4 and 7, the intake control valve 2 is provided with a valve body seal member 23 which is disposed at an outer periphery of the valve body 21. That is, the intake control valve 2 includes the resin-made valve body 21 which is directly pivotally mounted to the surge tank 1 and does not include, for example, a frame (body) for mounting the valve body 21 to the surge tank 1. The first end portion 21a (in the direction Y1) and a second end portion 21b (in the direction Y2) of the valve body 21 extending along the pivot axis L1 and in the direction Y are pivotally supported by the surge tank 1.

As shown in FIG. 4, in a state where the first and second end portions 21a, 21b are pivotally supported by the surge tank 1, the valve body 21 has a symmetric outer shape which is symmetric relative to the pivot axis L1 and relative to a center line C1 disposed in the direction orthogonal to the pivot axis L1. The valve body 21 has the outer shape which corresponds to or accords with the fluid passage 41 (see FIG. 4) in a planar view. The valve body 21 includes a first tapered portion 21c (in the direction Y1) and a second tapered portion 21d (in the direction Y2) which are disposed at positions close to the first end portion 21a and the second end portion 21b, respectively. Each of the first and second tapered portions 21c, 21d is tapered toward each end of the first end portion 21a and the second end portion 21b.

As shown in FIGS. 5 and 10, the second end portion 21b which is disposed at a position of the valve body 21 in the direction Y2 along the axial direction is integrally provided with a pivot shaft 24. The pivot shaft 24 is made of metal (for example, stainless steel or aluminum alloy) and pivots with the valve body 21. That is, the intake control valve 2 is configured such that the second end portion 21b of the valve body 21 is integrally formed with the pivot shaft 24 by insert molding when resin molding the valve body 21.

Specifically, the second end portion 21b of the valve body 21 is provided with a pivot shaft holding portion 212 which holds the pivot shaft 24. In a state where the intake control valve 2 is pivotally supported by the surge tank 1, an end surface 212a of the pivot shaft holding portion 212 which is disposed at a position of the pivot shaft holding portion 212 in the direction Y2 faces and is in contact with an end surface 13b of the pivot shaft support portion 13a which is disposed at a position of the pivot shaft support portion 13a in the direction Y1.

As shown in FIGS. 5 and 10, the pivot shaft 24 is provided with a narrow-body shaft portion 241, a thick-body shaft portion 242 and a holding portion 243 which are disposed in the aforementioned order from a distal end portion of the pivot shaft 24 toward the valve body 21. The distal end portion of the pivot shaft 24 protrudes outward from the valve body 21. The thick-body shaft portion 242 has the outer diameter larger than the outer diameter of the narrow-body shaft portion 241. The holding portion 243 is held by the pivot shaft holding portion 212. As shown in FIG. 10, the pivot shaft 24 is pivotally supported by a second bearing 22. The second bearing 22 is made of metal and is formed in a cylinder shape. The second bearing 22 is fixed to the pivot shaft support portion 13a of the outer circumferential wall portion 13 of the surge tank 1.

As shown in FIG. 10, in a state where the pivot shaft 24 is disposed in the pivot shaft support hole 131 of the pivot shaft support portion 13a, the second bearing 22 is press-fitted into and disposed at a portion between an outer circumferential surface 242a of the thick-body shaft portion 242 of the pivot shaft 24 and an inner circumferential surface 131d of the small diameter portion 131a of the pivot shaft support hole 131. Thus, the pivot shaft 24 is pivotally supported by the second bearing 22. The second bearing 22 is made from metal (for example, stainless steel or aluminum alloy). An inner circumferential surface 213a of the second bearing 22 is coated with fluororesin, for example, PTFE for reducing the sliding resistance generated between the inner circumferential surface 213a and the outer circumferential surface 242a of the thick-body shaft portion 242 of the pivot shaft 24. Here, the inner diameter of the second bearing 22 is constant along an extending direction of the pivot shaft 24 (in the direction Y). The outer circumferential surface 242a of the pivot shaft 24 is in surface-contact with the inner circumferential surface 213a of the second bearing 22.

As shown in FIG. 10, a pivot shaft seal member 214 is provided at a clearance between an outer circumferential surface 241a of the narrow-body shaft portion 241 of the pivot shaft 24 and an inner circumferential surface 131e of the intermediate diameter portion 131b of the pivot shaft support hole 131 at the intermediate diameter portion 131b which is disposed outward relative to the small diameter portion 131a of the pivot shaft support hole 131, the small diameter portion 131a being provided with the second bearing 22. The pivot shaft seal member 214 is formed in an annular shape and is provided at an outer circumferential portion of the narrow-body shaft portion 241 of the pivot shaft 24. The pivot shaft seal member 214 includes an inner protrusion 214a and an outer protrusion 214b. The inner protrusion 214a is formed in an annular shape and protrudes inward or toward the pivot shaft 24. The outer protrusion 214b is formed in an annular shape and protrudes outward or toward the pivot shaft support portion 13a. The outer circumferential surface 241a of the narrow-body shaft portion 241 of the pivot shaft 24 is in line-contact with the annular inner protrusion 214a. The annular pivot shaft seal member 214 has a U-shape cross section which opens outward of the surge tank 1, that is, in the direction Y2. The outer protrusion 214b is in surface-contact with the inner circumferential surface 131e of the intermediate diameter portion 131b of the pivot shaft support hole 131 annularly or in the circumferential direction. Thus, external air flowing from outside toward inside the surge tank 1 is efficiently blocked.

As shown in FIG. 5, in a state where the valve body 21 is pivotally mounted to the surge tank 1, the pivot shaft 24 protrudes outward of the pivot shaft support portion 13a of the outer circumferential wall portion 13. A shaft mounting portion 120a of the actuator 120 which pivots the pivot shaft 24 is mounted to a portion of the pivot shaft 24 protruding outward of the pivot shaft support portion 13a. The actuator 120 is fixed to the pivot shaft support portion 13a outside the surge tank 1.

As shown in FIG. 4, each of a front side and a back side of the valve body 21 is integrally formed with plural lateral libs 216a extending in a direction orthogonal to the pivot axis L1 and plural longitudinal libs 216b connecting the plural lateral libs 216a with one another. At a portion close to a center portion of the valve body 21 in the longitudinal direction (in the direction Y), the respective plural lateral libs 216a are formed to extend close to opposing end portions of the valve body 21 in a direction orthogonal to the longitudinal direction (in the direction X in FIG. 4). The plural lateral libs 216a are formed shorter as being away from the center portion of the valve body 21 and as being close to the opposing end portions of the valve body 21 in the longitudinal direction. Because the lateral libs 216a which are formed at the center portion of the valve body 21 in the longitudinal direction are formed long in the direction X, the mechanical strength of the center portion of the valve body 21 in the longitudinal direction is enhanced.

The valve body seal member 23 is made from an elastic member (for example, a lubber) and seals the division wall 4 and the valve body 21 by coming in contact with the division wall 4 of the surge tank 1 when the valve body 21 is closed. Specifically, as shown in FIG. 7, the valve body seal member 23 comes in contact with the first seal surface 411a and the second seal surface 412a which are provided along the rim portion of the fluid passage 41 of the division wall 4. The valve body seal member 23 includes protruding portions 231 protruding toward the first seal surface 411a and the second seal surface 412a, respectively. The valve body seal member 23 seals the division wall 4 and the valve body 21 when the protruding portions 231 come in contact with and are compressed or pressurized by the first and second seal surfaces 411a, 412a, respectively, at the closed position (shown with dotted lines in FIG. 7) of the valve body 21.

Next, the process for mounting the intake control valve 2 to the surge tank 1 will be explained with reference to FIGS. 5, 6 and 10 to 12.

Figure 11:
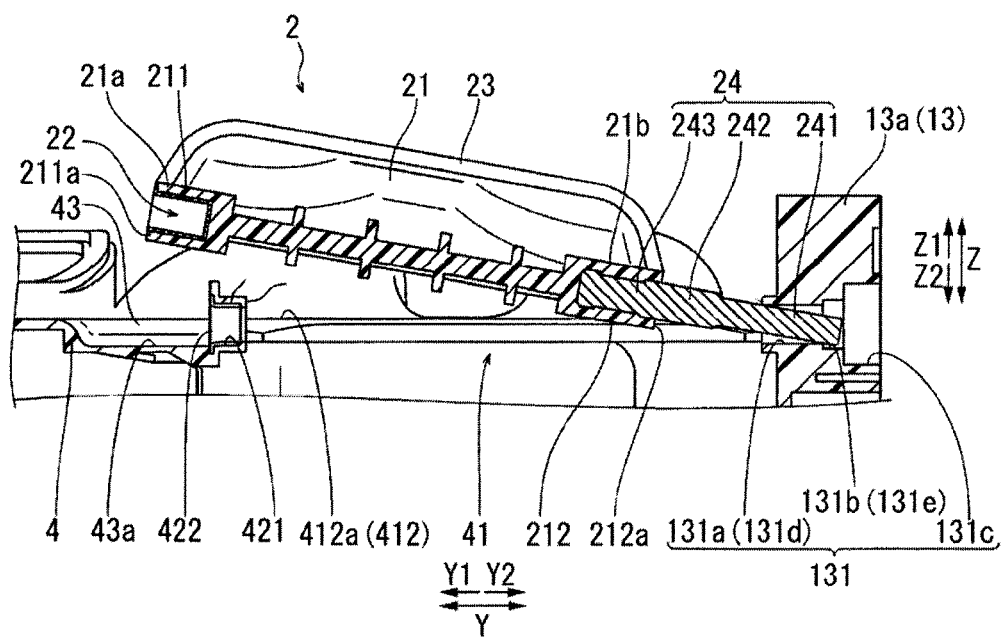
FIG. 11 is an explanatory view illustrating a process for mounting a pivot shaft to a pivot shaft supporting portion when the intake control valve is mounted to the surge tank according to the first embodiment.

As shown in FIG. 11, the resin-made valve body 21 is insert-molded so as to include the first bearing 22 at the first end portion 21a and to include the pivot shaft 24 at the second end portion 21b. In a state where the valve body seal member 23 is provided at a circumference of the valve body 21 and while the valve body 21 is inclined or tilted, the narrow-body shaft portion 241 of the pivot shaft 24 is inserted into the pivot shaft support hole 131 which does not include the second bearing 22. Because the outer diameter of the narrow-body shaft portion 241 of the pivot shaft 24 is smaller than the outer diameter of the thick-body shaft portion 242, the pivot shaft support hole 131 includes a sufficient space or clearance at the inner circumferential surface 131d of the small diameter portion 131a relative to the narrow-body shaft portion 241. Along with that, the pivot shaft support hole 131 includes a space or clearance at the inner circumferential surface 131d of the small diameter portion 131a of the pivot shaft support hole 131 relative to the thick-body shaft portion 242 of the pivot shaft 24 by a plate thickness of the second bearing 22 (for example, approximately 1 millimeter). Thus, while the valve body 21 is inclined or tilted, the pivot shaft 24 is easily inserted into the pivot shaft support hole 131.

Figure 12:
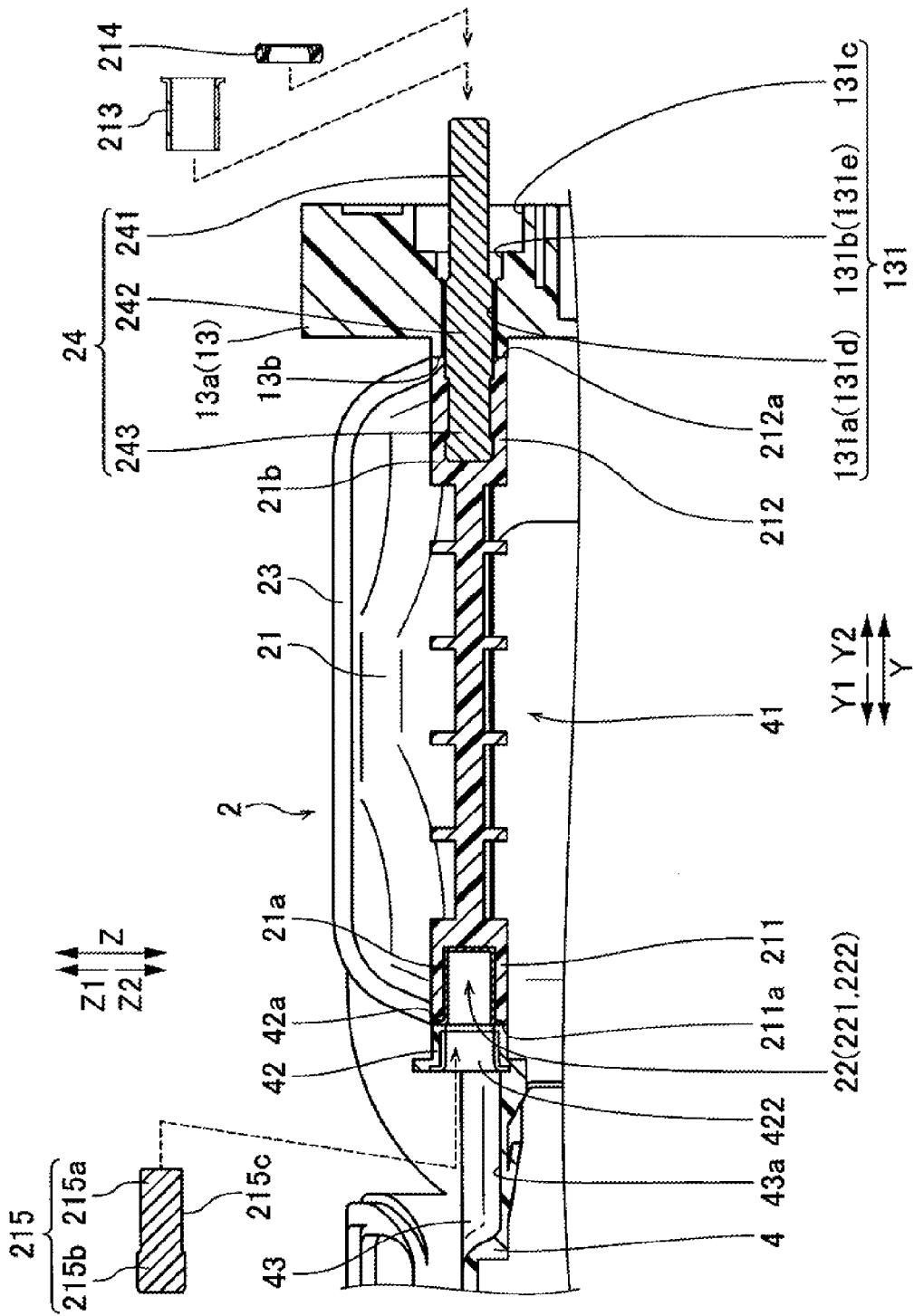
FIG. 12 is an explanatory view illustrating a process for inserting a second bearing and a pivot shaft seal member into the second end portion of the valve body when the intake control valve is mounted to the surge tank according to the first embodiment.

In a state where the pivot shaft 24 disposed at the second end portion 21b of the valve body 21 is disposed in the pivot shaft support hole 131, the first end portion 21a which is provided with the first bearing 22 is inserted into the fluid passage 41 while the valve body 21 is inclined or tilted. Accordingly, as shown in FIG. 12, the pivot shaft holding portion 212 (disposed at a position of the valve body 21 in the direction Y2) of the valve body 21 faces the pivot shaft support portion 13a of the outer circumferential wall portion 13 of the surge tank 1 and comes in contact with the end surface 13b. Along with that, the bearing holding portion 211 (disposed at a position of the valve body 21 in the direction Y1) faces the shaft member fixing portion 42 of the division wall 4 and comes in contact with the end surface 42a.

Then, as shown in FIG. 12, at the second end portion 21b of the valve body 21, the second bearing 22 is press-fitted into a portion between the outer circumferential surface 242a (see FIG. 10) of the thick-body shaft portion 242 of the pivot shaft 24 and the inner circumferential surface 131d of the small diameter portion 131a of the pivot shaft support hole 131. Next, the annular pivot shaft seal member 214 is fitted into a portion between the outer circumferential surface 241a (see FIG. 10) of the narrow-body shaft portion 241 of the pivot shaft 24 and the inner circumferential surface 131e of the intermediate diameter portion 131b of the pivot shaft support hole 131. Then, as shown in FIG. 6, at the first end portion 21a of the valve body 21, the shaft member 215 slidingly moves in the direction Y2 along the pivot axis L1 of the valve body 21 and is inserted into the shaft member fixing portion 42 by an application of a space or clearance (recess) within the recess 43 of the division wall 4. Along with that, the press-fit portion 215b is press-fitted into the metal-made bush member 422 which is integrally mounted to the shaft member fixing portion 42.

As shown in FIG. 6, at this time, the sliding portion 215a of the shaft member 215 is inserted and pushed into the bearing holding portion 211 so as to reach a position which corresponds to the first bearing 22, or a portion where the first bearing 22 is disposed. Thus, the first and second end portions 21a, 21b of the valve body 21 are pivotally supported by the surge tank 1. Then, as shown in FIG. 5, the shaft mounting portion 120a of the actuator 120 which pivots the pivot shaft 24 is mounted to the portion of the pivot shaft 24 protruding outward of the pivot shaft support portion 13a. The actuator 120 is fixed to the pivot shaft support portion 13a outside the surge tank 1. As such, the intake control valve 2 is mounted to the surge tank 1 (see FIG. 5).

According to the first embodiment, the following effects and advantages are attained.

According to the aforementioned first embodiment, the metal-made first bearing 22 is integrally mounted to the first end portion 21a of the valve body 21 by insert molding when resin molding the resin-made valve body 21. Accordingly, the metal-made first bearing 22 does not have to be press-fitted into the first end portion 21a of the resin-molded valve body 21. In addition, there is no concern about resin cracking caused by the difference in linear expansion coefficient between resin material and metal material (the first bearing 22) after the press-fitting. Accordingly, because the bearing holding portion 211 of the valve body 21 holding the first bearing 22 does not have to be thickened, the bearing holding portion 211 is downsized. That is, because the bearing holding portion 211 does not have to be formed to protrude largely from the surface of the valve body 21, the resistance (the pressure loss) of the fluid passage 41 does not increase. As a result, even in a case where the resin-made valve body 21 is applied (even in a case where the valve body 21 is made of resin), the pressure loss of the fluid passage 41 communicating with two spaces within the surge tank 1 is reduced to secure the intake amount. Accordingly, the supercharging effect is enhanced.

According to the first embodiment, because the metal-made first bearing 22 is integrally provided with the first end portion 21a of the valve body 21 by insert molding, the process for manufacturing the intake control valve 2 in which the first bearing 22 is press-fitted into the resin-molded valve body 21 is reduced. In addition, when the intake control valve 2 is manufactured, the processing of the bearing portion relative to the valve body 21 is not required. Accordingly, the valve body 21 is further freely designed. That is, because the valve body 21 may be designed to include a shape which takes into consideration of not only the reduction of the pressure loss but also the mountability of the intake control valve 2, the mountability thereof to the surge tank 1 is enhanced. The resin cracking does not occur at the portion of the valve body 21 (the bearing holding portion 211) which surrounds the first bearing 22. In addition, because there is no concern about the variance of the inner diameter of the first bearing 22, the variance caused by the press-fitting process, the product quality of the intake control valve 2 is securely maintained.

According to the first embodiment, the first bearing 22 includes the resin layer 222 which is disposed at the inner circumferential surface 22f of the first bearing 22 and which is made from the fluororesin material including the slidability. Thus, when the intake control valve 2 pivots within the surge tank 1, the first bearing 22 smoothly pivots relative to the sliding portion 215a of the shaft member 215 which is fitted to (inserted into) the first bearing 22 via the resin layer 222, the resin layer 222 which includes the slidability. Accordingly, the rotational torque of the valve body 21 (the intake control valve 2) is reduced. Because the first bearing 22 pivots smoothly, the inner circumferential surface 22f of the first bearing 22 and the sliding portion 215a of the shaft member 215 are prevented from generating abnormal noise (friction noise).

According to the first embodiment, the resin layer 222 is made from the material which is mixed with fluororesin. Thus, the slidability of the inner circumferential surface 22f of the first bearing 22 is easily enhanced. In a case where the first bearing 22 pivots, fluororesin which is disposed on the surface layer portion is applied on the outer circumferential surface 215c of the sliding portion 215a of the shaft member 215. Accordingly, the slidability of the first bearing 22 relative to the shaft member 215 (the sliding portion 215a) is securely maintained.

According to the first embodiment, the first bearing 22 is made from a stainless steel plate-shaped body which is rolled to be formed in a cylindrical shape. Thus, the first bearing 22 before being integrally mounted to the resin-made valve body 21 by insert molding is easily formed. Because the first bearing 22 is manufactured by a process for rolling the stainless steel plate-shaped body, the design (specification) of the first bearing 22 can be promptly changed or modified, for example, the diameter of the first bearing 22 can be promptly changed or modified.

According to the first embodiment, the first bearing 22 includes the flange portion 22b which is provided at the end surface 211a of the bearing holding portion 211, the end surface 211a corresponding to the first end portion 21a of the resin-made valve body 21. Thus, in a case where the first bearing 22 is insert-molded to the valve body 21 when resin molding the valve body 21, the flange portion 22b of the first bearing 22 which is disposed at the end surface 211a of the first end portion 21a of the valve body 21 prevents melted resin from flowing into the circumferential surface 22f of the first bearing 22 and generating burrs after solidified. Accordingly, the molding quality of the intake control valve 2 after insert molding is enhanced. Because the metal-made flange portion 22b of the first bearing 22 is disposed at the end surface 211a of the first end portion 21a of the valve body 21, the shaft holding portion 211 (the end surface 211a)

serving as the outer end portion of the valve body 21 is prevented from being worn out excessively during the pivot of the intake control valve 2.

According to the first embodiment, the first bearing 22 includes the resin layer 222 which is provided at the surface 22i of the flange portion 22b which extends from or which is continuously provided from the inner circumferential surface 22f of the first bearing 22 and is made from the material having the sound absorbability. Accordingly, even in a case where the intake control valve 2 which is mounted in the surge tank 1 backlashes in the axial direction (in the direction Y1 or the direction Y2) caused by, for example, the manufacturing deviation (or mounting error), the valve body 21 (the bearing holding portion 211) and the surge tank 1 (the shaft member fixing portion 42) come in contact with each other via the resin layer 222 which is provided at the surface layer portion of the flange portion 22b of the first bearing 22, the surface layer portion applied on the end surface 211a serving as the outer end portion of the valve body 21. Because the resin layer 222 has the sound absorbability, the contact noise (rattling) of the intake control valve 2 relative to the surge tank 1 is reduced.

According to the first embodiment, the first bearing 22 is made from a plate-shaped body which is rolled to be formed in a cylindrical shape and includes the first and second side end surfaces 22c, 22d serving as a pair and facing each other in the circumferential direction. Because the first and second end surfaces 22c, 22d of the first bearing 22 serving as a pair come in contact with each other by the molding pressure when resin molding the valve body 21, the cylindrical first bearing 22 is formed with the inner circumferential surface 22f which extends or is provided continuously throughout the whole circumference. Thus, the cylindrical first bearing 22 is easily formed with the inner circumferential surface 22f which extends or which is provided continuously throughout the whole circumference by applying the molding pressure to the first bearing 22 when resin molding the valve body 21. At this time, because the first and second side surfaces 22c, 22d of the first bearing 22 serving as a pair come in contact with each other to form the shape of the first bearing 22, the first bearing 22 easily obtains the cylindrical shape (circularity), the cylindrical shape (circularity) defined after the first bearing 22 is insert-molded, even in a case where the first bearing 22 is made from the plate-shaped body.

According to the first embodiment, the first bearing 22 is pivotally supported by the shaft member 215 which is fixed to the shaft member fixing portion 42 of the division wall 4 of the surge tank 1. Accordingly, in a case where the shaft member 215 is provided at the surge tank 1, the intake control valve 2 which reduces the pressure loss is easily and rotatably disposed within the surge tank 1 because the first bearing 22 is integrally mounted to the valve body 21 by being insert-molded.

According to the first embodiment, the metal-made pivot shaft 24 is integrally mounted to the second end portion 21b of the valve body 21 by insert molding when resin molding the resin-made valve body 21. Thus, not only the metal-made first bearing 22 but also the metal-made pivot shaft 24 do not have to be press-fitted into the first end portion 21a and the second end portion 21b of the resin-made valve body 21, respectively. Further, there is no concern about resin cracking caused by the difference in linear expansion coefficient between resin material and metal material (the first bearing 22) after the press-fitting. Accordingly, because the pivot shaft holding portion 212 holding the pivot shaft 24 does not have to be thickened, the pivot shaft holding portion 212 is downsized. That is, because the pivot shaft holding portion 212 does not have to be formed to protrude largely from the surface of the valve body 21, the resistance (the pressure loss) of the fluid passage 41 does not increase. As a result, even in a case where the resin-made valve body 21 is applied (even in a case where the valve body 21 is made of resin), the pressure loss of the fluid passage 41 communicating with two spaces within the surge tank 1 is reduced to secure the intake amount. Accordingly, the supercharging effect is enhanced. Because the metal-made pivot shaft 24 is integrally provided with the second end portion 21b of the valve body 21 by insert molding, the process for manufacturing the intake control valve 2 in which the pivot shaft 24 is press-fitted into the resin-molded valve body 21 is reduced. In addition, when the intake control valve 2 is manufactured, the processing of the pivot shaft 24 is not required. Accordingly, the valve body 21 is further freely designed. Thus, the mountability of the intake control valve 2 to the surge tank 1 is enhanced. In addition, there is no concern about resin cracking at the valve body 21 (the pivot shaft holding portion 212) which surrounds the pivot shaft 24, the product quality of the intake control valve 2 is securely maintained.

According to the first embodiment, when resin molding the valve body 21, the first and second end portions 22g, 22h of the flange portion 22b which are continuously provided from or extend from the first and second side end surfaces 22c, 22d serving as a pair in the circumferential direction, respectively, are separated from each other while the first side end and the second end surfaces 22c, 22d of the first bearing 22 serving as a pair come in contact with each other to be formed in a cylindrical shape by the molding pressure. Accordingly, when insert molding the first bearing 22, the first and second side end surfaces 22c, 22d are prevented from not coming in contact with each other because the first and second end portions 22g, 22h of the flange portion 22b disposed in the circumferential direction come in contact (interfere) with each other. That is, because each of the first and second end portions 22g, 22h includes an allowance, the first and second side end surfaces 22c, 22d serving as a pair come in contact with each other securely. Thus, the first bearing 22 is securely formed in a cylindrical shape (circularity) after being insert-molded.

According to the first embodiment, the end surface 211a of the bearing holding portion 211 which is disposed at the first end portion 21a of the valve body 21 comes in surface-contact with the circular surface 22i of the flange portion 22b by insert molding of the first bearing 22. The surface 22i of the flange portion 22b is formed to have a flat surface without protrusions and recesses relative to the end surface 211a of the bearing holding portion 211 of the valve body 21. Accordingly, the valve body 21 pivots relative to the surge tank 1 without generating the unwanted friction or, for example, the recesses on the end surface 42a of the shaft member fixing portion 42. In addition, because the first bearing 22 pivots smoothly, the sliding portions of the valve body 21 and the surge tank 1 are prevented from generating the abnormal noise (friction noise).

A second embodiment of this disclosure will be explained with reference to FIGS. 3, 4, 6, 9, 13 to 15. According to the first embodiment, the first bearing 22 (see in FIG. 6) has the constant inner diameter dl (see FIG. 9) along the extending direction (in the direction Y) of the shaft member 215. In contrast, according to the second embodiment, a valve body 521 is provided with a first bearing 522 (i.e., serving as a bearing) in which the inner diameter of the center portion of the first bearing 522 and the inner diameters of opposing end portions of the first bearing 522 are different in size because a resin layer 525 includes different thicknesses t of in the axial direction (in the direction Y). The same components as those described in the first embodiment are marked with the same reference numerals.

Figure 13:
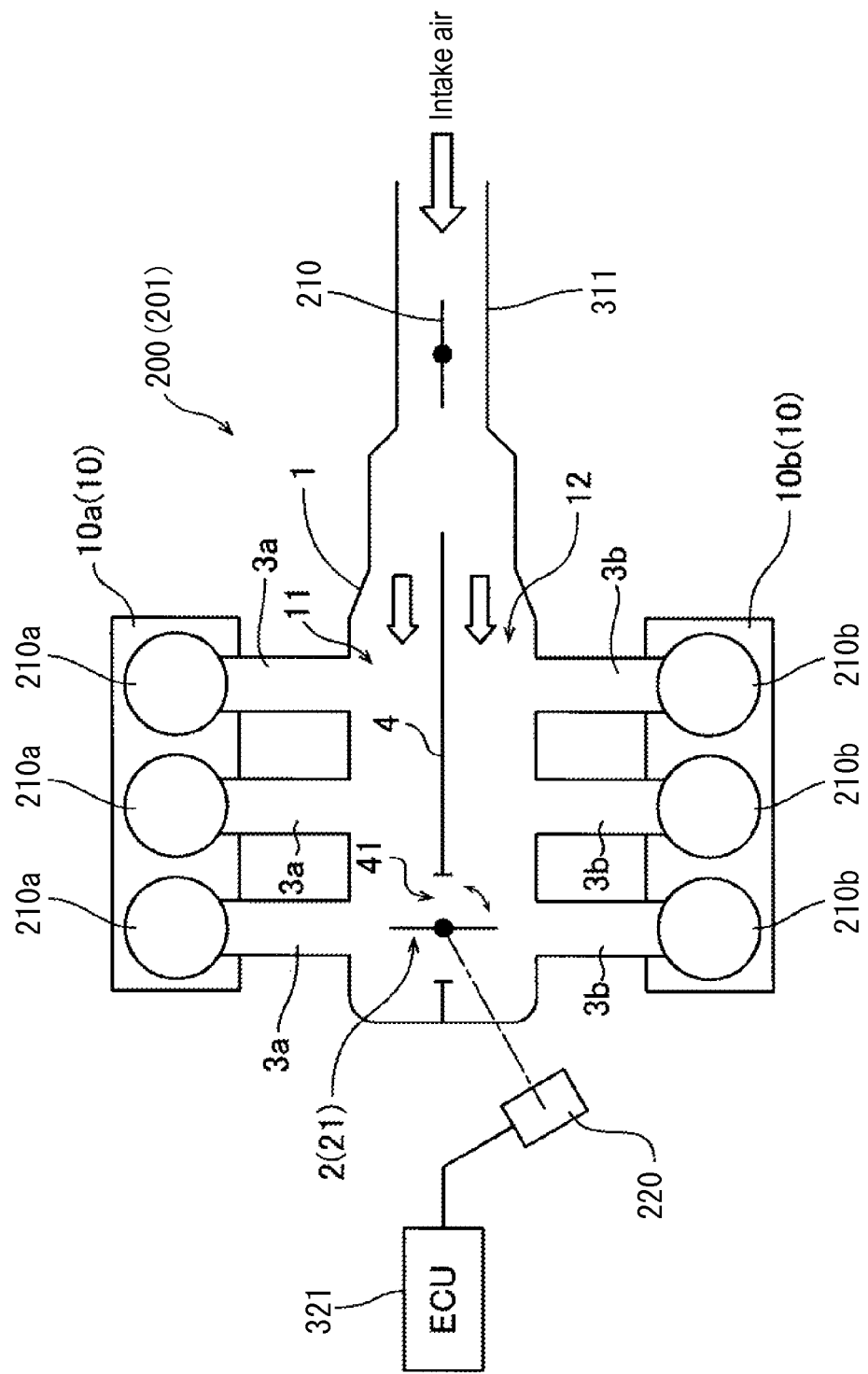
FIG. 13 is a view schematically illustrating the construction of an intake apparatus according to a second embodiment disclosed here.
Figure 14:
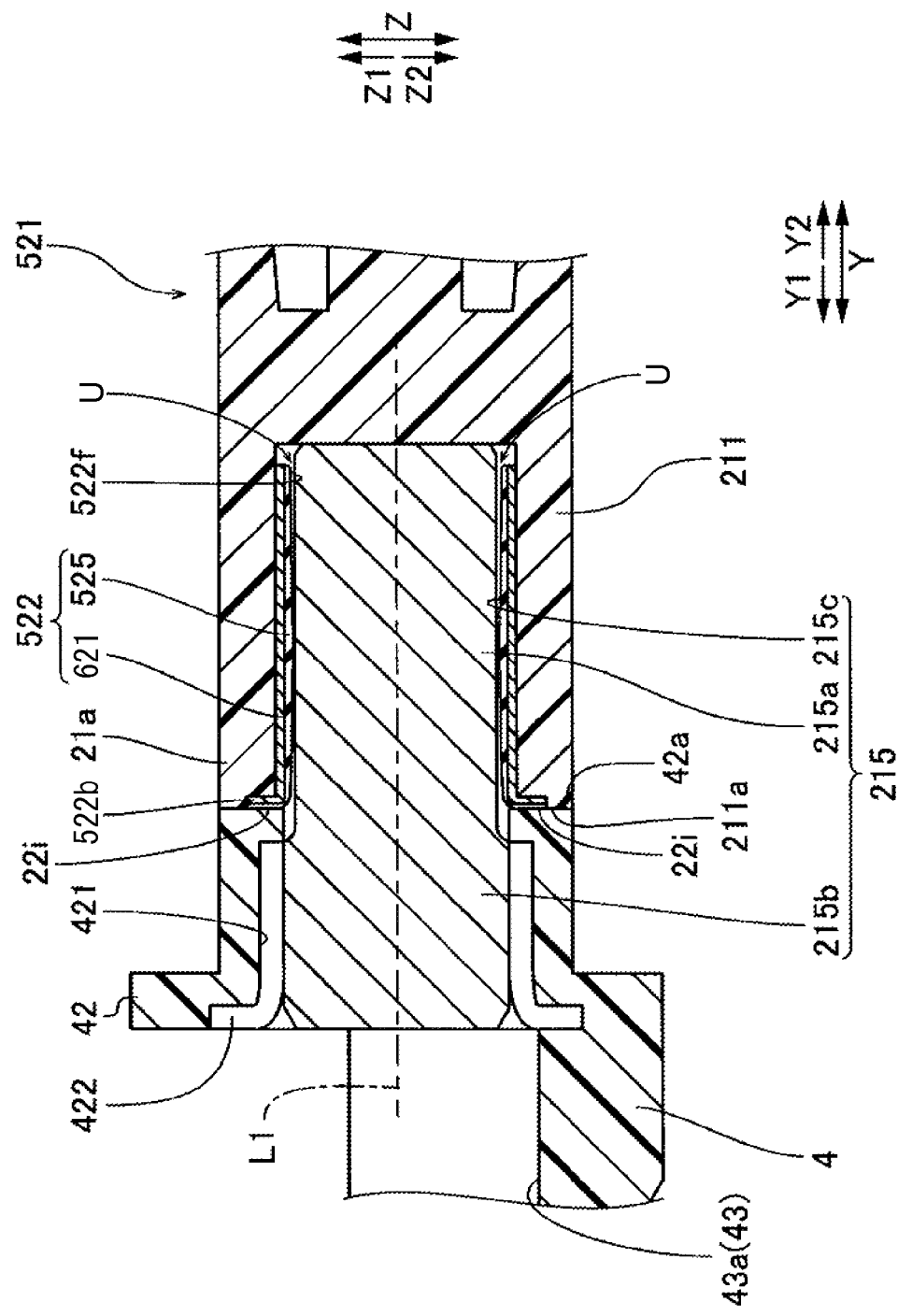
FIG. 14 is a cross sectional view illustrating a first bearing supporting a first end portion of an intake control valve (valve body) according to a second embodiment.

According to the second embodiment, as shown in FIG. 13, an intake apparatus 200 includes an intake apparatus body 201, a throttle 210, an intake passage 311, an Engine Control Unit (ECU) 321, an actuator 220, three cylinders 210a and three cylinders 210b, As shown in FIG. 14, the shaft member 215 is pivotally supported by the resin-made valve body 521 via the first bearing 522. The shaft member 215 is inserted (press-fitted) into the shaft member fixing portion 42 (see FIG. 3) of the division wall 4 of the surge tank 1 (see FIG. 3). The first bearing 522 is integrally formed with the valve body 521 by being insert-molded.

In a state where the shaft member 215 is press-fitted into and inserted to the bush member 422 of the shaft member fixing portion 42 in the direction Y2, the sliding portion 215a of the shaft member 215 slides on the inner circumferential surface 522f of the metal-made (stainless steel) first bearing 522. The first bearing 522 includes a body portion 621 and the resin layer 525. The body portion 621 is formed in a cylindrical shape and includes a flange portion 522b. The resin layer 525 is formed on the inner circumferential surface 522f of the body portion 621.

According to the second embodiment, as shown in FIG. 15, the first bearing 522 is configured such that each of an inner diameter d22 of a first end portion 502 (end portion in the direction Y1) and an inner diameter d23 of a second end portion 503 (end portion in the diameter Y2) is larger than an inner diameter d21 (the minimum value) of a center portion 501 in the direction Y (d22 is larger than d21 and d23 is larger than d21). In such a case, the inner diameter of the first bearing 522 increases toward the first and second end portions 502, 503 in the directions Y1, Y2 from the center portion 501, respectively. That is, the inner circumferential surface 522f of the first bearing 522 includes a curved cross section in which the inner diameter d21 of the center portion 501 of the first bearing 522 is the smallest and gradually increases from the center portion 501 toward the first and second end portions 502, 503. The inner circumferential surface 522f is formed to include a predetermined curvature radius along the direction Y. The same curved cross sections are formed when viewed along the axial direction (in the direction Y) and about the pivot axis L1.

The curved cross section of the first bearing 522 is formed such that the respective thicknesses t of the first and second end portions 502, 503 of the resin layer 525 are smaller than the thickness t of the center portion 501 of the resin layer 525. That is, when the first bearing 522 is manufactured, the process (stamping and shaving) for reducing the thickness t of the range corresponding to the first and second end portions 502, 503 relative to the thickness of the range corresponding to the center portion 501 is performed after the resin layer 222 is formed with the flat thickness or constant thickness t and is disposed on the surface of a flat plate (a piece of plate) serving as the body portion 521. Accordingly, the resin layer 525 includes the aforementioned curved cross section including the predetermined curvature radius. Then, the first bearing 522 is rolled to be formed in a cylindrical shape and includes the flange portion 522b.

According to the second embodiment, as shown in FIG. 15, the shaft member 215 is supported by the first bearing 522 such that the sliding portion 215a (the outer circumferential surface 215c) of the shaft member 215 comes in contact (line-contact) with the portion of the inner circumferential surface 522f of the first bearing 522 (the portion of the inner diameter d21 (see FIG. 15)), the portion corresponding to the center portion 501 including the inner circumferential surface 522f which forms the smallest diameter. In contrast, each of the first and second end portions 502, 503 of the first bearing 522 includes a clearance U between the outer circumferential surface 215c of the sliding portion 215a and the inner circumferential surface 522f, respectively. The shaft member 215 (the sliding portion 215a) is movably disposed at the clearances U.

In a case where the metal-made shaft member 215 mounted to the middle piece 101c generates the axial misalignment (axial misalignment when the shaft member 215 pivots) caused by a slight distortion (mounting error) generated at the resin-made intake apparatus body 101 (see FIG. 3) or the middle piece 101c (see FIG. 3) which is one of the components of the intake apparatus body 101, the clearances U between the outer circumferential surface 215c of sliding portion 215a of the shaft member 215 and the inner circumferential surface 522f of the first bearing 522 absorb the axial misalignment because the pivot shaft 24 (see FIG. 4) pivoting the valve body 521 is pivotally supported only by the center portion 501 of the first bearing 522. Accordingly, the shaft member 215 (the sliding portion 215a) smoothly and freely pivots relative to the valve body 521. During the pivot of the valve body 521, the outer circumferential surface 215c of the sliding portion 215a of the shaft member 215 comes in contact with only either the center portion 501 of the first bearing 522 or the inner circumferential surfaces 522f of one of the first and second end portions 502, 503 because the shaft (the pivot axis L1) is inclined at a slight degree. The respective contact dimensions (sliding dimensions) of the outer circumferential surface 215c and the inner circumferential surface 522f are reduced appropriately. Other constructions of the intake apparatus 200 of the second embodiment are as described in the first embodiment.

According to the second embodiment, the following effects and advantages are attained.

According to the aforementioned second embodiment, the first bearing 522 is formed such that the respective inner diameters d22, d23 of the first and second end portions 502, 503 are larger than the inner diameter d21 of the center portion 501. According to the first embodiment, the shaft member 215 provided at the surge tank 1 to pivot the valve body 521 is in surface-contact with the whole range of the inner circumferential surface 22f (see FIG. 9) of the first bearing 22 which includes the same inner diameter to support the valve body 21. In contrast, according to the second embodiment, the valve body 521 is held in a state where the clearances U are provided somewhere between the sliding portion 215a (the outer circumferential surface 215c) of the shaft member 215 and the inner circumferential surface 522f of the first bearing 522 on the basis of the difference in the inner diameter of the center portion 501 of the first bearing 522 from the respective inner diameters of the first and second end portions 502, 503 (the difference in the inner diameter d21 and the inner diameter d22 (d23)). Thus, even if the pivot axis L1 of the shaft member 215 is inclined slightly, the clearances U between the outer circumferential surface 215c of the shaft member 215 and the inner circumferential surface 522f of the first bearing 522 absorb the axial misalignment. Accordingly, the valve body 521 smoothly and freely pivots.

According to the second embodiment, the first bearing 522 is configured such that the inner diameter of the first bearing 522 gradually increases from the inner diameter d21 of the center portion 501 to the respective inner diameters d22, d23 of the first and second end portions 502, 503. Accordingly, the shaft member 215 which is provided at the surge tank 1 to pivot the valve body 521 is supported at the center portion 501 of the first bearing 522 which comes in contact with the shaft member 215 in the circumferential direction. Along with that, the first bearing 522 includes the clearances U which are provided between the outer circumferential surface 215c of the sliding portion 215a and the inner circumferential surface 522f and are disposed at the respective first and second end portions 502, 503 of the first bearing 522. Thus, even if the shaft member 215 is axially misaligned during pivoting, the axial misalignment is appropriately absorbed by one of the first and second end portions 502, 503 of the first bearing 522. Along with that, the valve body 521 is securely supported at the center portion 501 of the first bearing 522 which includes the smallest inner diameter d21.

According to the second embodiment, the inner circumferential surface 522f of the first bearing 522 includes the curved cross section in which the inner diameter of the first bearing 522 gradually increases from the center portion 501 toward the respective first and second end portions 502, 503. Accordingly, the clearances U are provided between the outer circumferential surface 215c of the shaft member 215 and the inner circumferential surface 522f of the first bearing 522, each of the clearances U which gradually increases from the center portion 501 to each of the first and second end portions 502, 503. Thus, unlike a case where the first bearing 522 includes the cross section in which the clearance U suddenly and rapidly increases at each of the first and second end portions 502, 503 relative to the center portion 501, the valve body 521 is prevented from rattling more than a predetermined level.

According to the second embodiment, the first bearing 522 includes the inner circumferential surface 522f which forms the respective inner diameters d22, d23 of the first and second end portions 502, 503 larger than the inner diameter d21 of the center portion 501 by the adjustment of the thickness t of the resin layer 525. Thus, because the first bearing 522 is formed to include the different thicknesses t of the resin layer 525 between the center portion 501 and the respective first and second end portions 502, 503 of the first bearing 522, the first bearing 522 is easily provided with the respective inner diameters d22, d23 of the first and second end portions 502, 503 which are larger than the inner diameter d21 of the center portion 501. Because the surface (the inner circumferential surface 522f) of the resin layer 525 is supported by the first bearing 522, the resin-made valve body 521 smoothly pivots. Accordingly, the slidability is further enhanced. Other effects and advantages of the intake apparatus of the second embodiment are as described in the first embodiment.

According to the aforementioned first and second embodiments, the intake control valve 2 and the intake apparatus 100, 200 of this disclosure is applied to, for example, the V-6 engine 10 for the automobile, however, is not limited to this. The intake control valve 2 and the intake apparatus 100, 200 of this disclosure can be applied to an internal combustion engine other than an engine for the automobile. Alternatively, the intake control valve 2 and the intake apparatus 100, 200 of this disclosure can be applied to a V engine other than the V6 engine 10 or can be applied to a serial engine.

According to the first and second embodiments, the resin layer 222 (525) of the first bearing 22 (522) is made from the mixture of resin and fluororesin, for example, PTFE, however, is not limited to this. Alternatively, the resin layer 222 (525) of the first bearing 22 (522) is made of the mixture of resin and a molybdenum which corresponds to a material including the slidability.

According to the first and second embodiments, the resin layer 222 (525) which is made from the mixture of resin and fluororesin, for example, PTFE is provided at the body portion 221 (621) and the flange portion 22b, 522b of the first bearing 22 (522), however, is not limited to this. That is, the first resin layer of this disclosure provided at the inner circumferential surface 22f (522f) of the first bearing 22 (522) and the second resin layer of this disclosure provided at the surface 22i of the flange portion 22b, 522b of the first bearing 22 (522) are made from different materials. The first resin layer can be any material as long as the material includes the slidability. The second resin layer can be any material as long as the material includes the sound absorbability.

According to the first and second embodiments, the first and second surge tanks 11, 12 which are divided or defined by the division wall 4 are disposed in parallel with (next to) each other and are positioned in the up-down direction (vertical direction), however is not limited to this. The first and second surge tanks 11, 12 can be disposed in parallel with (next to) each other in the lateral direction. Alternatively, the first and second surge tanks 11, 12 can be disposed in parallel with (next to) each other in a direction other than the up-down direction and the lateral direction.

According to the first and second embodiments, the first end portion 21a (the end portion in the direction Y) of the resin-made valve body 21 (521) is integrally provided with the metal-made first bearing 22 (522) by insert molding. Along with that, the second end portion 21b (the end portion in the direction Y2) of the valve body 21 (521) is integrally provided with the metal-made pivot shaft 24 by insert molding. Alternatively, the first end portion 21a of the valve body 21 (521) is integrally formed with the pivot shaft 24 while the second end portion 21b of the valve body 21 (521) is integrally formed with the first bearing 22. Alternatively, the first and second end portions 21a, 21b of the valve body 21 are integrally formed with one of the first bearing 22 and the pivot shaft 24.

According to the first and second embodiments, the first bearing 22 (522) is made of stainless steel, however is not limited to this. Alternatively, the first bearing 22 (522) is made from an iron metal plate other than stainless steel.

According to the first and second embodiments, the shaft member fixing portion 42 and the pivot shaft support portion 13a are integrally formed with the surge tank 1, however is not limited to this. Alternatively, the shaft member fixing portion 42 and the pivot shaft support portion 13a are provided separately from the surge tank 1. Alternatively, one of the shaft member fixing portion 42 and the pivot shaft support portion 13a is integrally formed with the surge tank 1 while the other of the shaft member fixing portion 42 and the pivot shaft support portion 13a is provided separately from the surge tank 1.

According to the second embodiment, the inner circumferential surface 522f of the first bearing 522 includes the curved cross section in which the center portion 501 has the inner diameter which gradually increases from the center portion 501 toward each of the first and second end portions 502, 503, however is not limited to this. Alternatively, the cross section of the inner circumferential surface 522f along the direction Y (the pivot axis L1) does not have to be curved. For example, the inner circumferential surface 522f is formed to include a linear inclined surface (having the cross section of the linear inclined surface) inclined downwardly from the center portion 501 toward each of the first and second end portions 502, 503. Alternatively, the inner circumferential surface 522*f* of the first bearing 522 is not limited to be formed with the curved surface or the linear inclined surface which is continuously curved or inclined throughout the whole surface. That is, the inner circumferential surface 522*f* has the inner diameter d21 at the center portion 501 (the center portion 501 and a portion close to the center portion 501) and the respective inner diameters d22 and d23 at the first and second end portions 502, 503 via small step portions (diameter enlarging portions). Alternatively, the inner circumferential surface 522*f* may be formed with one of the first and second end portions 502, 503 which has an inner diameter larger than the inner diameter of the center portion 501.

According to the second embodiment, the center portion 501 of the first bearing 522 includes the smallest inner diameter d21, however is not limited to this. Not only the center portion 501 but also the belt-shaped range which is slightly away from the center portion 501 to the first end portion 502 (the direction Y1) and the second end portion 503 (the direction Y2) includes the inner diameter d21.

According to the aforementioned embodiment, the intake control valve 2 includes the valve body 21, 521 being made of resin, the valve body 21, 521 configured to be pivotally mounted to the surge tank 1 of the internal combustion engine (the V6 engine 10), the valve body 21, 521 pivoting between the open position and the closed position to for opening and closing the fluid passage 41 formed at a division wall 4, the division wall 4 dividing inside of the surge tank 1 into two portions, the bearing (the first bearing 22, 522) being made of metal, the bearing (the first bearing 22, 522) being integrally provided with a first end portion 21*a* of the valve body 21, 521 by insert molding when resin molding the resin-made valve body 21, 521.

According to the aforementioned first embodiment, the metal-made first bearing 22 is integrally mounted to the first end portion 21*a* of the valve body 21, 521 by insert molding when resin molding the resin-made valve body 21, 521. Accordingly, the metal-made first bearing 22, 522 does not have to be press-fitted into the first end portion 21*a* of the resin-molded valve body 21, 521. In addition, there is no concern about resin cracking caused by the difference in linear expansion coefficient between resin material and metal material (the first bearing 22, 522) after the press-fitting. Accordingly, because a housing portion (the bearing holding portion 211) of the valve body 21, 521 holding the first bearing 22, 522 does not have to be thickened, the housing portion (the bearing holding portion 211) is downsized. That is, because the bearing holding portion 211 does not have to be formed to protrude largely from the surface of the valve body 21, 521, the resistance (the pressure loss) of the fluid passage 41 does not increase. As a result, even in a case where the resin-made valve body 21, 521 is applied (even in a case where the valve body 21, 521 is made of resin), the pressure loss of the fluid passage 41 communicating with two spaces within the surge tank 1 is reduced to secure the intake amount. Accordingly, the supercharging effect is enhanced.

According to the aforementioned construction, because the metal-made first bearing 22, 522 is integrally provided with the first end portion 21*a* of the valve body 21, 521 by insert molding, the process for manufacturing the intake control valve 2 in which the first bearing 22, 522 is press-fitted into the resin-molded valve body 21, 521 is reduced. The resin cracking does not occur at the portion of the valve body 21, 521 (the bearing holding portion 211) which surrounds the first bearing 22, 522. In addition, because there is no concern about the variance of the inner diameter of the first bearing 22, 522, the variance caused by the press-fitting process, the product quality of the intake control valve 2 is securely maintained.

According to the aforementioned construction, the bearing (the first bearing 22, 522) includes the resin layer 222, 525 provided at the inner circumferential surface 22*f*, 522*f* of the bearing (the first bearing 22, 522), the resin layer 222, 525 being made from the material which includes slidability.

According to the aforementioned construction, when the intake control valve 2 pivots within the surge tank 1, the first bearing 22, 522 smoothly pivots relative to the sliding portion 215*a* of the shaft member 215 which is fitted to (inserted into) the first bearing 22, 522 via the resin layer 222, the resin layer 222 which includes the slidability. Accordingly, the rotational torque of the valve body 21, 521 (the intake control valve 2) is reduced. Because the first bearing 22, 522 pivots smoothly, the inner circumferential surface 22*f*, 522*f* of the first bearing 22 and the sliding portion 215*a* of the shaft member 215 are prevented from generating abnormal noise (friction noise).

According to the aforementioned embodiment, the resin layer 222, 525 is made of fluororesin.

According to the aforementioned construction, the slidability of the inner circumferential surface 22*f*, 522*f* of the first bearing 22, 522 is easily enhanced. In a case where the first bearing 22, 522 pivots, fluororesin which is disposed on the surface layer portion is applied on the outer circumferential surface 215*c* of the sliding portion 215*a* of the shaft member 215. Accordingly, the slidability of the first bearing 22, 522 relative to the shaft member 215 (the sliding portion 215*a*) is securely maintained.

According to the aforementioned embodiment, the bearing (the first bearing 22, 522) is made from a plate-shaped body which is made of metal, the plate-shaped body being rolled to be formed in a cylindrical shape.

According to the aforementioned construction, the first bearing 22, 522 before being integrally mounted to the resin-made valve body 21, 521 by insert molding is easily formed. Because the first bearing 22, 522 is manufactured by a process for rolling the stainless steel plate-shaped body, the design (specification) of the first bearing 22, 522 can be promptly changed or modified, for example, the diameter of the first bearing 22, 522 can be promptly changed or modified.

According to the aforementioned embodiment, the bearing (the first bearing 22, 522) includes a flange portion 22*b*, 522*b* being provided at an outer end portion 211*a* of the first end portion 21*a* of the resin-made valve body 21, 521.

According to the aforementioned construction, in a case where the first bearing 22, 522 is insert-molded to the valve body 21, 521 when resin molding the valve body 21, 521, the flange portion 22*b*, 522*b* of the first bearing 22, 522 which is disposed at the end surface 211*a* of the first end portion 21*a* of the valve body 21, 521 prevents melted resin from flowing into the circumferential surface 22*f* of the first bearing 22, 522 and generating burrs after solidified. Accordingly, the molding quality of the intake control valve 2 after insert molding is enhanced. Because the metal-made flange portion 22*b* of the first bearing 22, 522 is disposed at the end surface 211*a* of the first end portion 21*a* of the valve body 21, 521, the shaft holding portion 211 (the end surface 211*a*) serving as the outer end portion of the valve body 21, 521 is prevented from being worn out excessively during the pivot of the intake control valve 2.

According to the aforementioned embodiment, the bearing (the first bearing 22, 522) includes a resin layer 222, 525 provided at a surface 22i of the flange portion 22b, 522b, the surface 22i extending continuously from an inner circumferential surface 22f, 522f of the bearing 22, 522; and the resin layer 222, 525 is made from a material which includes sound absorbability.

According to the aforementioned construction, even in a case where the intake control valve 2 which is mounted in the surge tank 1 backlashes in the axial direction (in the direction Y1 or the direction Y2) caused by, for example, the manufacturing deviation (or mounting error), the valve body 21, 521 (the housing portion, the bearing holding portion 211) and the surge tank 1 (the shaft member fixing portion 42) come in contact with each other via the resin layer 222 which is provided at the surface layer portion of the flange portion 22b of the first bearing 22, the surface layer portion applied on the end surface 211a serving as the outer end portion of the valve body 21, 521. Because the resin layer 222 has the sound absorbability, the contact noise (rattling) of the intake control valve 2 relative to the surge tank 1 is reduced.

According to the aforementioned embodiment, the bearing (the first bearing 22, 522) is made from a plate-shaped body which is rolled to be formed in a cylindrical shape, the bearing (the first bearing 22, 522) including a pair of facing surfaces (the first and second side end surfaces 22c, 22d) facing each other in a circumferential direction; and the cylindrical bearing (the first bearing 22, 522) including an inner circumferential surface 22f, 522f which extends continuously throughout a whole circumference of the bearing (the first bearing 22, 522) in the circumferential direction is formed by a contact of the pair of facing surfaces (the first and second side end surfaces 22c, 22d) of the bearing (the first bearing 22, 522) with each other by a molding pressure applied when resin molding the resin-made valve body (the first bearing 21, 521)

According to the aforementioned construction, the cylindrical first bearing 22, 522 is easily formed with the inner circumferential surface 22f, 522f which extends or which is provided continuously through the whole circumference by applying the molding pressure to the first bearing 22, 522 when resin molding the valve body 21, 521. At this time, because the first and second side surfaces 22c, 22d of the first bearing 22, 522 serving as a pair come in contact with each other to form the shape of the first bearing 22, the first bearing 22, 522 easily obtains the cylindrical shape (circularity), the cylindrical shape (circularity) defined after the first bearing 22, 522 is insert-molded, even in a case where the first bearing 22, 522 is made from the plate-shaped body.

According to the aforementioned embodiment, the bearing (the first bearing 22, 522) is pivotally supported by a shaft member 215, the shaft member 215 being fixed to a shaft member fixing portion 42 of the division wall 4 of the surge tank 1.

According to the aforementioned construction, in a case where the shaft member 215 is provided at the surge tank 1, the intake control valve 2 which reduces the pressure loss is easily and rotatably disposed within the surge tank 1 because the first bearing 22, 522 is integrally mounted to the valve body 21, 521 by being insert-molded.

According to the aforementioned embodiment, the intake control valve further includes a pivot shaft 24 being made of metal, the pivot shaft (24) being integrally provided with a second end portion 21b of the valve body 21, 521 by insert molding when resin molding the resin-made valve body 21, 521.

According to the aforementioned embodiment, not only the metal-made first bearing 22 but also the metal-made pivot shaft 24 do not have to be press-fitted into the first end portion 21a and the second end portion 21b of the resin-made valve body 21, 521, respectively. Further, there is no concern about resin cracking caused by the difference in linear expansion coefficient between resin material and metal material (the first bearing 22, 522) after the press-fitting. Accordingly, because the housing portion (the pivot shaft holding portion 212) holding the pivot shaft 24 does not have to be thickened, the housing portion (the pivot shaft holding portion 212) is downsized. That is, because the housing portion (the pivot shaft holding portion 212) does not have to be formed to protrude largely from the surface of the valve body 21, 521, the resistance (the pressure loss) of the fluid passage 41 does not increase. As a result, even in a case where the resin-made valve body 21 is applied (even in a case where the valve body 21, 521 is made of resin), the pressure loss of the fluid passage 41 communicating with two spaces within the surge tank 1 is reduced to secure the intake amount. Accordingly, the supercharging effect is enhanced. Because the metal-made pivot shaft 24 is integrally provided with the second end portion 21b of the valve body 21 by insert molding, the process for manufacturing the intake control valve 2 in which the pivot shaft 24 is press-fitted into the resin-molded valve body 21, 521 is reduced. In addition, when the intake control valve 2 is manufactured, the processing of the pivot shaft 24 is not required. Accordingly, the valve body 21, 521 is further freely designed. Thus, the mountability of the intake control valve 2 to the surge tank 1 is enhanced. In addition, there is no concern about resin cracking at the valve body 21, 521 (the pivot shaft holding portion 212) which surrounds the pivot shaft 24, the product quality of the intake control valve 2 is securely maintained.

According to the aforementioned embodiment, the intake apparatus 100, 200 includes a surge tank 1 being provided at an internal combustion engine (the V6 engine 10); a valve body (21, 521) being made of resin, the valve body 21, 521 being pivotally mounted to the surge tank 1 of an internal combustion engine (the V6 engine 10), the valve body 21, 521 pivoting between an open position and a closed position to for opening and closing a fluid passage 41 formed at a division wall 4, the division wall 4 dividing inside of the surge tank 1 into two portions; and a bearing (the first bearing 22, 522) being made of metal, the bearing (the first bearing 22, 522) being integrally provided with a first end portion 21a of the valve body 21, 521 by insert molding when resin molding the resin-made valve body 21, 521.

According to the aforementioned construction, the metal-made first bearing 22 is integrally mounted to the first end portion 21a of the valve body 21 by insert molding when resin molding the resin-made valve body 21. Accordingly, the metal-made first bearing 22 does not have to be press-fitted into the first end portion 21a of the resin-molded valve body 21. In addition, there is no concern about resin cracking caused by the difference in linear expansion coefficient between resin material and metal material (the first bearing 22) after the press-fitting. Accordingly, because the bearing holding portion 211 of the valve body 21 holding the first bearing 22 does not have to be thickened, the bearing holding portion 211 is downsized. That is, because the bearing holding portion 211 does not have to be formed to protrude largely from the surface of the valve body 21, the resistance (the pressure loss) of the fluid passage 41 does not increase. As a result, even in a case where the resin-made valve body 21 is applied (even in a case where the valve body 21 is made of resin), the pressure loss of the fluid passage 41 communicating with two spaces within the surge tank 1 is reduced to secure the intake amount. Accordingly, the supercharging effect is enhanced.

According to this disclosure, the following constructions are applicable.

According to the aforementioned construction, the first bearing 22, 522 includes the flange portion 22b, 522b which is provided at the end surface 211a of the first end portion 21a of the resin-made valve body 21, 521. The first bearing 22, 522 is made from the plate-shaped body which is rolled to be formed in a cylindrical shape and includes the first and second side end surfaces 22c, 22d facing each other in the circumferential direction. When resin molding the valve body 21, the first and second end portions 22g, 22h of the flange portion 22b which are continuously provided from or extend from the first and second side end surfaces 22c, 22d serving as a pair in the circumferential direction, respectively, are separated from each other while the first side and the second end surfaces 22c, 22d of the first bearing 22 serving as a pair come in contact with each other to be formed in a cylindrical shape by the molding pressure. Accordingly, when insert molding the first bearing 22, the first and second side end surfaces 22c, 22d are prevented from not coming in contact with each other because the first and second end portions 22g, 22h of the flange portion 22b disposed in the circumferential direction come in contact (interfere) with each other. That is, because each of the first and second end portions 22g, 22h includes an allowance, the first and second side end surfaces 22c, 22d serving as a pair come in contact with each other securely. Thus, the first bearing 22 is securely formed in a cylindrical shape (circularity) after being insert-molded.

According to the aforementioned construction, the first bearing 22, 522 includes the flange portion 22b, 522b which is provided at the end surface 211a of the first end portion 21a of the resin-made valve body 21, 521. The surface 22i of the flange portion 22b, 522b is formed to have a flat surface without protrusions and recesses relative to the end surface 211a of the housing portion (the bearing holding portion 211) of the valve body 21, 521. Accordingly, the valve body 21 pivots relative to the surge tank 1 without generating the unwanted friction or, for example, the recesses on the end surface 42a of the shaft member fixing portion 42. In addition, because the first bearing 22 pivots smoothly, the sliding portions of the valve body 21 and the surge tank 1 are prevented from generating the abnormal noise (friction noise).

The first bearing 522 is formed such that the respective inner diameters d22, d23 of the first and second end portions 502, 503 are larger than the inner diameter d21 of the center portion 501. According to the first embodiment, the shaft member 215 provided at the surge tank 1 to pivot the valve body 521 is in surface-contact with the whole range of the inner circumferential surface 22f (see FIG. 9) of the first bearing 22 which includes the same inner diameter to support the valve body 21. In contrast, according to the second embodiment, the valve body 521 is held in a state where the clearances U are provided somewhere between the sliding portion 215a (the outer circumferential surface 215c) of the shaft member 215 and the inner circumferential surface 522f of the first bearing 522 on the basis of the difference in the inner diameter of the center portion 501 of the first bearing 522 from the respective inner diameters of the first and second end portions 502, 503 (the difference in the inner diameter d21 and the inner diameter d22 (d23)). Thus, even if the pivot axis L1 of the shaft member 215 is inclined slightly, the clearances U between the outer circumferential surface 215c of the shaft member 215 and the inner circumferential surface 522f of the first bearing 522 absorb the axial misalignment. Accordingly, the valve body 521 smoothly and freely pivots.

The first bearing 522 is configured such that the inner diameter of the first bearing 522 gradually increases from the inner diameter d21 of the center portion 501 to the respective inner diameters d22, d23 of the first and second end portions 502, 503. Accordingly, the shaft member 215 which is provided at the surge tank 1 to pivot the valve body 521 is supported at the center portion 501 of the first bearing 522 which comes in contact with the shaft member 215 in the circumferential direction. Along with that, the first bearing 522 includes the clearances U which are provided between the outer circumferential surface 215c of the sliding portion 215a and the inner circumferential surface 522f and are disposed at the respective first and second end portions 502, 503 of the first bearing 522. Thus, even if the shaft member 215 is axially misaligned during pivoting, the axial misalignment is appropriately absorbed by one of the first and second end portions 502, 503 of the first bearing 522. Along with that, the valve body 521 is securely supported at the center portion 501 of the first bearing 522 which includes the smallest inner diameter d21.

According to the disclosure, the intake control valve 2 and the intake apparatus 100, 200 that enhance the supercharging effect by reducing the pressure loss of the fluid passage which communicates two spaces within the surge tank 1 to secure the intake air amount in a case where the valve body 21, 521 is made of resin can be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. An intake control valve, comprising:
a valve body being made of resin, the valve body configured to be pivotally mounted to a surge tank of an internal combustion engine, the valve body pivoting between an open position and a closed position to for opening and closing a fluid passage formed at a division wall, the division wall dividing inside of the surge tank into two portions; and
a bearing being made of metal, the bearing being integrally provided with a first end portion of the valve body by insert molding when resin molding the resin-made valve body, wherein
the bearing is made from a plate-shaped body which is rolled to be formed in a cylindrical shape, the bearing including a pair of facing surfaces facing each other in a circumferential direction; and
the cylindrical bearing including an inner circumferential surface which extends continuously throughout a whole circumference of the bearing in the circumferential direction is formed by a contact of the pair of facing surfaces of the bearing with each other by a molding pressure applied when resin molding the resin-made valve body.

2. The intake control valve according to claim 1, wherein the bearing includes a resin layer provided at an inner circumferential surface of the bearing, the resin layer being made from a material which includes slidability.

3. The intake control valve according to claim 2, wherein the resin layer is made of fluororesin.

4. The intake control valve according to claim 1, wherein the bearing is made from a plate-shaped body which is made of metal, the plate-shaped body being rolled to be formed in a cylindrical shape.

5. The intake control valve according to claim 1, wherein the bearing includes a flange portion being provided at an outer end portion of the first end portion of the resin-made valve body.

6. The intake control valve according to claim 5, wherein
the bearing includes a resin layer provided at a surface of the flange portion, the surface extending continuously from an inner circumferential surface of the bearing; and
the resin layer is made from a material which includes sound absorbability.

7. The intake control valve according to claim 1, wherein the bearing is pivotally supported by a shaft member, the shaft member being fixed to a shaft member fixing portion of the division wall of the surge tank.

8. The intake control valve according to claim 1, further comprising:
a pivot shaft being made of metal, the pivot shaft being integrally provided with a second end portion of the valve body by insert molding when resin molding the resin-made valve body.

9. An intake apparatus, comprising:
a surge tank being provided at an internal combustion engine;
a valve body being made of resin, the valve body being pivotally mounted to the surge tank of an internal combustion engine, the valve body pivoting between an open position and a closed position to for opening and closing a fluid passage formed at a division wall, the division wall dividing inside of the surge tank into two portions; and
a bearing being made of metal, the bearing being integrally provided with a first end portion of the valve body by insert molding when resin molding the resin-made valve body, wherein
the bearing is made from a plate-shaped body which is rolled to be formed in a cylindrical shape, the bearing including a pair of facing surfaces facing each other in a circumferential direction; and
the cylindrical bearing including an inner circumferential surface which extends continuously throughout a whole circumference of the bearing in the circumferential direction is formed by a contact of the pair of facing surfaces of the bearing with each other by a molding pressure applied when resin molding the resin-made valve body.

10. The intake apparatus according to claim 9, wherein the bearing includes a resin layer provided at an inner circumferential surface of the bearing, the resin layer being made from a material which includes slidability.

11. The intake apparatus according to claim 10, wherein the resin layer is made of fluororesin.

12. The intake apparatus according to claim 9, wherein the bearing is made from a plate-shaped body which is made of metal, the plate-shaped body being rolled to be formed in a cylindrical shape.

13. The intake apparatus according to claim 9, wherein the bearing includes a flange portion being provided at an outer end portion of the first end portion of the resin-made valve body.

14. The intake apparatus according to claim 13, wherein
the bearing includes a resin layer provided at a surface of the flange portion, the surface extending continuously from an inner circumferential surface of the bearing; and
the resin layer is made from a material which includes sound absorbability.

15. The intake apparatus according to claim 9, wherein the bearing is pivotally supported by a shaft member, the shaft member being fixed to a shaft member fixing portion of the division wall of the surge tank.

16. The intake apparatus according to claim 9, further comprising:
a pivot shaft being made of metal, the pivot shaft being integrally provided with a second end portion of the valve body by insert molding when resin molding the resin-made valve body.

* * * * *